(12) United States Patent
Odaira

(10) Patent No.: US 8,219,587 B2
(45) Date of Patent: Jul. 10, 2012

(54) METHOD FOR SEARCHING A TREE STRUCTURE

(75) Inventor: Rei Odaira, Kanagawa Prefecture (JP)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/570,077

(22) Filed: Sep. 30, 2009

(65) Prior Publication Data

US 2010/0082664 A1    Apr. 1, 2010

(30) Foreign Application Priority Data

Oct. 1, 2008    (JP) ................. 2008-256222

(51) Int. Cl.
*G06F 17/30* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS 6,047,283 A * 4/2000 Braun .................... 1/1

OTHER PUBLICATIONS

Wikipedia, the free encyclopedia, "Tree (Data Structure)," http://en.wikipedia.org/wiki/Tree_(data_structure), Aug. 31, 2009.
R. Bayer and E. McCreight, "Organization and Maintenance of Large Ordered Indexes", Acta Informatica, 1, pp. 173-189, 1972.
T. Lehman and M. Carey, "A Study of Index Structures for Main Memory Database Management Systems", Proc. 12th Very Large Databases Conf., pp. 294-303, 1986.
V. Lanin and D. Shasha, "A Symmetric Concurrent B-Tree Algorithm", Proceedings of the Fall Joint Computer Conference, pp. 380-389, 1986.

* cited by examiner

*Primary Examiner* — Isaac M Woo
(74) *Attorney, Agent, or Firm* — Gail H. Zarick

(57) ABSTRACT

A method, apparatus, and computer readable article of manufacture for tracing, on the basis of a key, an index created using a tree structure to access data. The method includes: searching the tree structure to reach a target node that can be associated with the key without acquiring a lock on the root node and on an internal node; setting the target node as a current node when the target node is a leaf node; moving the search to a node at a lower layer when the target node is an internal node by tracing an edge in the tree structure to reach a leaf node and setting the leaf node as the current node; and associating the key with the leaf node specified as the current node by acquiring a lock on the leaf node specified as the current node, thereby accessing the data.

18 Claims, 16 Drawing Sheets

FIG. 2

(a) NUMBER OF ELEMENTS = 2

(b) NUMBER OF ELEMENTS IS ACQUIRED IN SEARCH OPERATION
search (tree, 80)

NUMBER OF ELEMENTS = 2

(c) AS A RESULT OF INSERTION OPERATION insert (tree, 10, data), NEW ELEMENT IS INSERTED IN ROOT OF TREE TO WHICH NEW LEAF IS ADDED

NUMBER OF ELEMENTS = 3

(d) SEARCH OPERATION search (tree, 80) IS PERFORMED ON INSIDE OF ROOT OF TREE WHILE CONSIDERING NUMBER OF ELEMENTS = 2

NUMBER OF ELEMENTS = 3

(e) SEARCH OPERATION search (tree, 80) IS CONTINUOUSLY PERFORMED ON NEIGHBORING LEAF ON THE RIGHT TO DISCOVER KEY 80

NUMBER OF ELEMENTS = 3

FIG. 3
(a) NUMBER OF ELEMENTS = 3
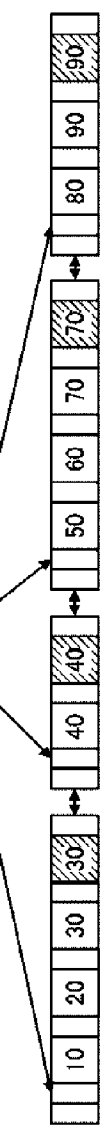
(b) NUMBER OF ELEMENTS IS ACQUIRED
IN SEARCH OPERATION search (tree, 80)
NUMBER OF ELEMENTS = 3
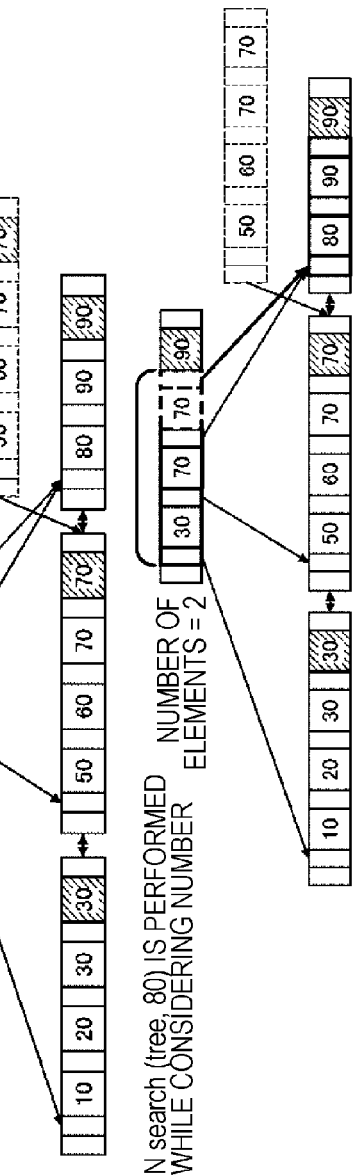
(c) AS A RESULT OF DELETION OPERATION delete (tree, 40), LEAF IS DELETED AND
ELEMENT IS DELETED FROM ROOT OF TREE
NUMBER OF ELEMENTS = 2
(d) SEARCH OPERATION search (tree, 80) IS PERFORMED
ON ROOT OF TREE WHILE CONSIDERING NUMBER
OF ELEMENTS = 3

FIG. 8
(a) WHEN LEAF IS TRACED FROM LEFT TO RIGHT, LOCK OF LEAF ON THE LEFT IS RELEASED AFTER ACQUISITION OF LOCK OF LEAF ON THE RIGHT USING LOCK COUPLING
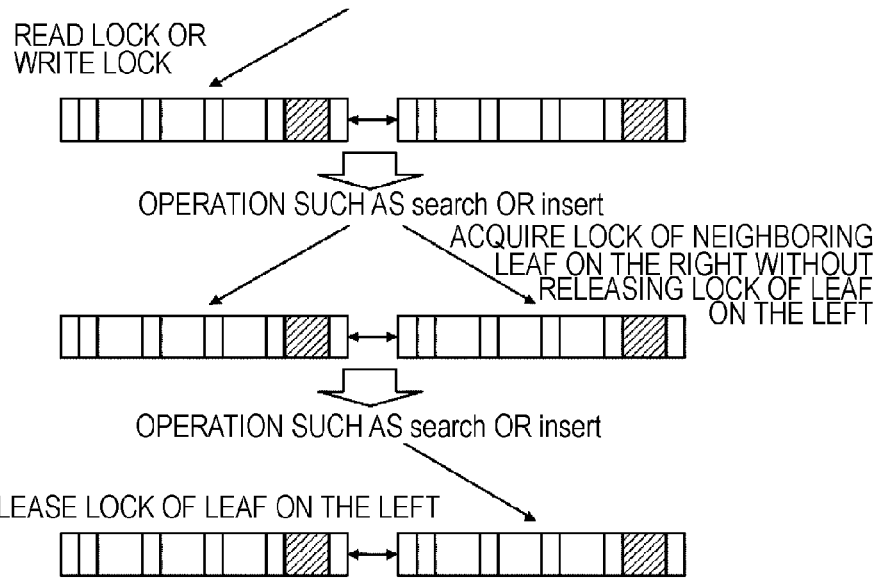
(b) WHEN LEAF IS TRACED FROM RIGHT TO LEFT, LOCK OF LEAF ON THE LEFT IS ACQUIRED AFTER RELEASE OF LOCK OF LEAF ON THE RIGHT WITHOUT USING LOCK COUPLING
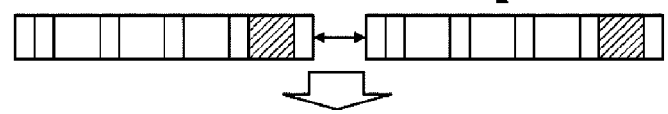
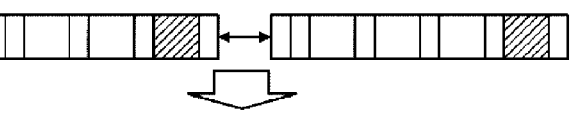
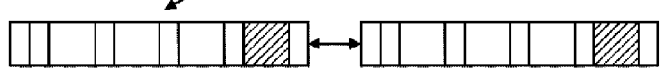

METHOD FOR SEARCHING A TREE STRUCTURE

CROSS-REFERENCE TO RELATED APPLICATION

This application claims priority under 35 U.S.C. §119 from Japanese Patent Application No. 2008-256222 filed on Oct. 1, 2008, the entire contents of which are incorporated herein by reference.

BACKGROUND OF THE INVENTION

1. Field of the Invention

The present invention relates to methods for using a tree structure in a data search. More particularly, the present invention relates to a method for searching the tree structure of a set of data stored on a computer-readable medium to manipulate target data.

2. Description of Related Art

The use of a tree structure to represent ordered data sets on a computer is known. See Non-Patent Document 1. The tree structure is represented by nodes and edges. The nodes are hierarchically associated with each other and with the edges. A single node at the highest layer of the tree structure is referred to as a root node, while nodes at the lowest layer of the tree structure are referred to as leaf nodes. For example, a tree structure is often used in the creation of an index of a database.

Operations, such as search, insertion, and deletion, are performed on data that can be represented by a tree structure. In addition, varieties of tree structures are known. These include: the B tree, Non-Patent Document 2; the B+ tree derived from the B tree, the T tree particularly used as a tree structure in a memory, Non-Patent Document 3; and the B-link tree which provides improved throughput and scalability, Non-Patent Document 4. Scalability is one kind of extensibility and particularly indicates a capability for coping with an increase in the amount of work which can be performed. When an apparatus, such as a computer, uses a tree structure, a synchronization operation or mechanism, such as a lock or a semaphore, is used to realize parallel operations.

FIGS. 17(a) to 17(c) illustrate tree structures according to related art. These tree structures are represented with nodes, shown as rectangles, and edges or links that connect the nodes. The nodes are associated with various kinds of data, shown as number quantities within the nodes, representing, e.g., a value, a condition, another data structure, and another tree structure. For example, the data can be a value or a set of values, which can serve as a criterion in the comparison of a magnitude relation.

Each node in the tree structure has zero or more child nodes, which are generally located at lower layers in the tree structure. That is, the tree structure includes child nodes that constitute a plurality of layers. A node at the top of the tree structure is referred to as a root node. The nodes at the bottom of the tree structure are referred to as leaf nodes. The tree structures shown in FIGS. 17(a) to 17(c) can be used in a process for looking up data for use in a specific search, also referred to as a search key or simply referred to as a key, on a storage medium.

FIG. 17(a) is a block diagram illustrating the concept of a B+ tree according to the related art. Data in the root node is shown at the top layer of FIG. 17(a), while a set of data stored on a computer-readable medium is shown at the bottom. An index that is a process for searching for target data from the computer-readable medium is shown between the top layer and the bottom layer.

The index can include, for example, a branching condition. A plurality of pieces of data at the bottom layer can be stored on a computer-readable medium in accordance with a magnitude relation between the data pieces. First, a specific value is set as the target data located at the top layer before a search is started. In the intermediate process, an index that can handle the target data is specified using indices representing a magnitude relation for some pieces of data on the computer-readable medium in the B+ tree in accordance with a rule. An example of a rule is that another index indicating a smaller value range is used if the value of the target data is smaller than a range indicated by a specific index. The target data is then used as an input of magnitude-relation conditional branching of the specified index. On the basis of whether a determination result regarding this branch condition is true or not, a storage area that can include the target data can be narrowed down or specified from a whole area of the recording medium shown at the bottom layer in FIG. 17(a).

FIG. 17(b) is a block diagram showing an example of a T tree according to the related art. The T tree shown in FIG. 17(b) can be a binary search tree. For example, a universal set of data stored on a computer-readable medium can be exclusively divided into a plurality of subsets on the basis of a magnitude relation between values by which the T tree can be constructed. Each of the subsets can include a boundary condition regarding values as an index and information regarding links to other neighboring subsets that have consecutive boundaries. Target data can be searched in accordance with a known search algorithm, such as, for example, a preorder search, an inorder search, or a postorder search. In this manner, a specific subset including the target data can be narrowed down or specified.

FIG. 17(c) is a block diagram showing an example of a B-link tree according to the related art. Although the B-link tree shown in FIG. 17(c) resembles the B tree shown in FIG. 17(a), each node of the B-link tree structure can include a "high key", which is information on the maximum value that this node or child nodes at the lower layers can have. In FIG. 17(c), the "high key" of each node is illustrated having a thick frame.

Furthermore, nodes in the same layer can be linked to one another in one direction, e.g., toward the right in the drawing, with a unidirectional list in the B-link tree according to the related art. When a node is deleted, a pointer called "outlink" is associated from the deleted node to a neighboring node on the left. To execute a search in a specific node, acquisition and/or release of a lock on the specific node are executed in the B-link tree.

References

Non-Patent Document 1: Wikipedia, the free encyclopedia, "Tree (Data Structure)," http://en.wikipedia.org/wiki/Tree_(data_structure) or http://ja.wikipedia.org/wiki/%E6%9C%A8%E6%A7%8B%E9%80%A0_(%E3%83%87%E3%83%BC%E3%82%BF%E6%A7%8B%E9%80%A0).

Non-Patent Document 2: R. Bayer and E. McCreight, "Organization and Maintenance of Large Ordered Indexes", Acta Informatica, 1, pp. 173-189, 1972.

Non-Patent Document 3: T. Lehman and M. Carey, "A Study of Index Structures for Main Memory Database Management Systems", Proc. 12th Very Large Databases Conf., pp. 294-303, 1986.

Non-Patent Document 4: V. Lanin and D. Shasha, "A Symmetric Concurrent B-Tree Algorithm", Proceedings of the Fall Joint Computer Conference, pp. 380-389, 1986.

SUMMARY OF THE INVENTION

In the related art, a synchronization operation can apply a very large load to a central processing unit (CPU). That is, the synchronization operation is so-called "heavy" processing. In particular, in the case of a tree structure constructed on a disk or a memory not having a network input/output (I/O), overhead for the synchronization operation directly leads to a decrease in throughput. Contention caused in the synchronization operation is likely to cause a decrease in scalability. More specifically, as the frequency of the processing regarding a search key becomes higher, processing results are not obtained in proportion to the frequency of processing and processing efficiency decreases. This, at the same time, can cause a problem such that a user of a database search can be unable to obtain full efficiency even using recent servers that attempt to improve processing efficiency by allowing a plurality of CPUs to operate in parallel to perform a high-speed search for an increasing quantity of data.

In addition, since read/write locks are used often in existing tree structures, overhead is large and scalability is low. Although contention between read locks is not caused logically, acquisition and release of the read locks are a critical section. Thus, frequent acquisition of a read lock on a specific object decreases scalability. More specifically, since a read/write lock on a root node is kept, having been acquired during the operation of a B tree, a B+ tree, or a T tree, and the lock is acquired only once at the maximum, the overhead is small. However, a decrease in the scalability results since a lock for a single object is acquired and released.

An object of the present invention is to provide a method for searching a tree structure that can realize high throughput by realizing both small overhead and high scalability when parallelism in data references increases, such as in cases where access to a database is performed at a high frequency.

Therefore, in a first aspect of the present invention, there is provided a method implemented by a computing apparatus for tracing, on the basis of a key, an index created using a tree structure in order to access data stored on a computer-readable article of manufacture, the tree structure including one root node and at least one leaf node, the leaf node, when at least two leaf nodes are present, (i) includes information that represents a relation with a neighboring leaf node and (ii) is bidirectionally linked to the neighboring leaf node.

The method includes the steps of: searching the tree structure to reach a target node that can be associated with the key without acquiring a lock on the root node and on an internal node in the tree structure; setting the target node as a current node when the target node is a leaf node; moving the search to a node at a lower layer in the tree structure, when the target node is an internal node, by tracing an edge in the tree structure to reach a leaf node and setting the leaf node as the current node; and associating the key with the leaf node specified as the current node by acquiring a lock on the leaf node specified as the current node, thereby accessing data stored on the computer-readable article of manufacture by the computing apparatus.

In yet another aspect of the present invention, there is provided a computer readable article of manufacture tangibly embodying computer readable instructions for executing the computer implemented method.

In still another aspect of the present invention, there is provided a computer apparatus for tracing, on the basis of a key, an index created using a tree structure in order to access data stored on a computer-readable article of manufacture, the tree structure including one root node and at least one leaf node, the leaf node, when at least two leaf nodes are present, (i) includes information that represents a relation with a neighboring leaf node and (ii) is bidirectionally linked to the neighboring leaf node.

The system includes: means for searching the tree structure to reach a node that can be associated with the key without acquiring a lock on the root node and on an internal node in the tree structure; means for setting the searched-for node as a current node when the searched-for node is a leaf node; means for moving the search to a node at a lower layer in the tree structure, when the searched-for node is an internal node, by tracing an edge in the tree structure to reach a leaf node and setting the leaf node as the current node; and means for associating the key with the leaf node specified as the current node by acquiring a lock on the leaf node specified as the current node.

BRIEF DESCRIPTION OF THE DRAWINGS

FIGS. 2(a) to 2(e) are diagrams illustrating processing performed when contention between a read operation and a write operation occurs in an internal node according to an embodiment of the present invention.

FIGS. 3(a) to 3(d) are diagrams illustrating processing performed when contention between a search operation and a deletion operation occurs according to an embodiment of the present invention.

FIGS. 8(a) and 8(b) are diagrams showing methods for avoiding deadlock in a method for searching a tree structure according to an embodiment of the present invention.

DETAILED DESCRIPTION OF THE PREFERRED EMBODIMENTS

Figure 1:
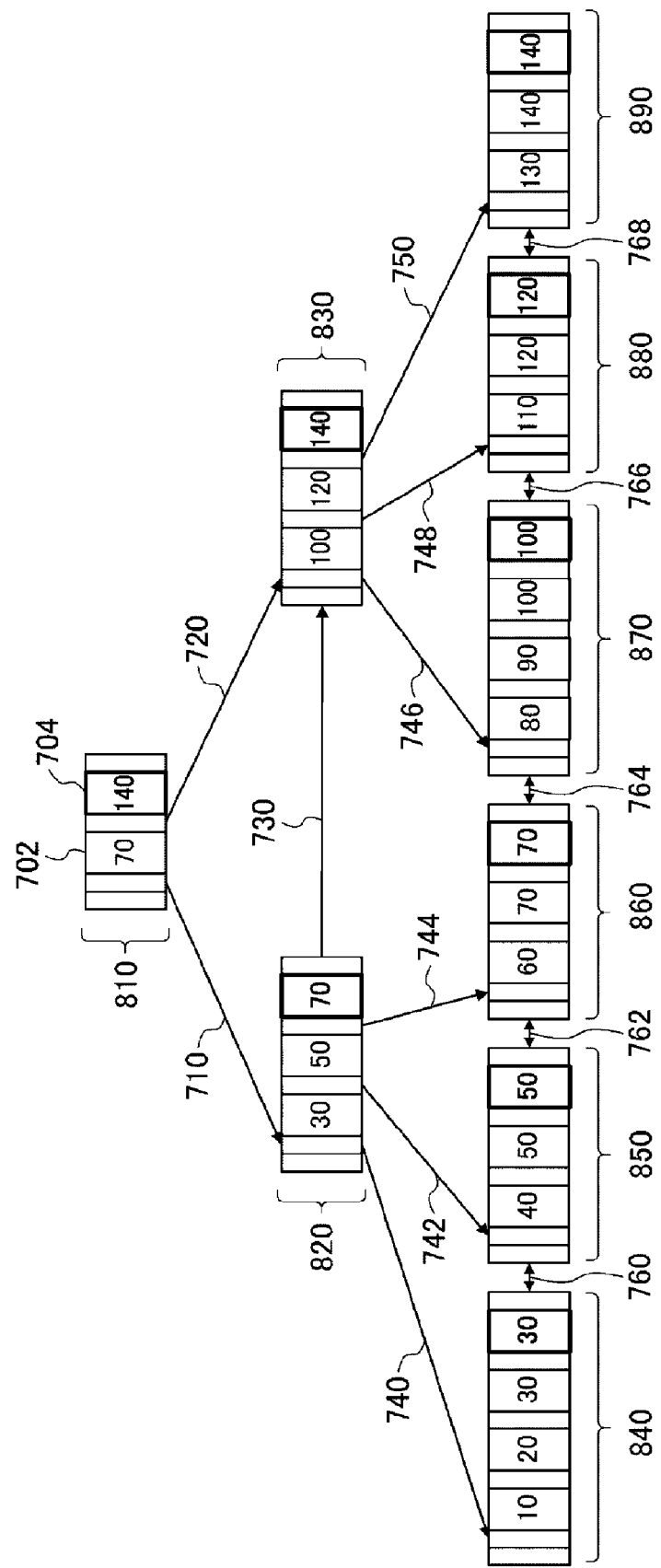
FIG. 1 is a block diagram showing a concept of a Bc-link tree according to an embodiment of the present invention.

In view of the above-described problems, the present invention provides the solutions described below. The term "acquisition of a lock" or "to lock" used in this specification indicates a state where a given node included in a tree structure is locked to perform specific processing. The term "release of a lock" indicates that a locked state is canceled. A computer-readable medium includes a medium from which data can be read using any given physical means, such as magnetic, electrical, or optical means, e.g. a computer readable article of manufacture. It can be a read-only medium or a writable medium. Items of information stored on a computer-readable medium are arranged, for example, from the left to the right or from the front direction to the following direction, in accordance with a magnitude relation of reference addresses or values associated with the information.

In a tree structure according to the present invention, small overhead and high scalability are realized by minimizing the frequency of acquisition of a lock at the time of descending of the tree. The present invention includes a method for acquiring locks only for leaf nodes and for skipping acquisition of locks for internal nodes included in the tree structure. In a method according to the present invention, a search can reach a leaf node that can include a target key, target data, or neighboring leaf nodes at a high speed by skipping the acquisition of locks on internal nodes.

Also, in the method according to the present invention, when the search has reached a leaf node not including the target key, the search can reach a leaf node that can include the target key by tracing a bidirectional list of leaf nodes while acquiring a lock. Here, the bidirectional list according to the present invention indicates an edge that represents an association between neighboring leaf nodes among edges constituting the tree structure. More specifically, the bidirectional list indicates an association between neighboring leaf nodes that can represent a continuity of value ranges or a continuity of value magnitude relations by linking the neighboring nodes. The association directions of the bidirectional list include both the right direction and the left direction.

In an embodiment, in a method for searching a tree structure according to the present invention, a memory barrier instruction, which is a CPU instruction for enforcing an ordering constraint on memory operations, can be used in order not to load an invalid pointer in an internal node during descending of the tree. For example, the use of the memory barrier instruction allows means for implementing the method according to the present invention to execute, after loading the number of elements included in a node that the search has reached during descending of the tree, a load-load barrier instruction and to load a key and data of the node. In general, the memory barrier instruction can be an operation whose processing load is lighter than acquisition/release of a lock.

The present invention can be combined with existing technologies, such as symmetrical multiprocessing, parallel computing, a multi-core machine technology, or related technologies. Technologies resulting from such combinations are also included in the technical scope of the present invention. Similarly, a database system using the present invention and a fault tolerant system having a replica technique or mirroring are also included in the technical scope of the present invention.

Each step of the method for searching a tree structure according to the present invention can be provided as a field programmable gate array (FPGA), an application specific integrated circuit (ASIC), an equivalent hardware logic element, a programmable integrated circuit, or a program storable in combinations of those elements, i.e., a program product.

More specifically, means, devices, built-in apparatuses for realizing the method for the searching a tree structure according to the present invention can be provided as an embodiment of a custom large-scale integrated circuit (LSI) having a data I/O, a data bus, a memory bus, and a system bus. A program product stored in such an integrated circuit can be also included in the technical scope of the present invention.

According to the present invention, both small overhead and high scalability can be obtained without increasing the processing load of a CPU related to a synchronization operation and overhead related to a conventional tree structure search method that frequently uses read/write locks. Accordingly, the method according to the present invention can provide processing results substantially in proportion to increases in the load. Thus, databases that can take full advantage of a configuration of recent servers that attempt to improve processing efficiency by allowing a plurality of processors to operate in parallel can be realized. According to the present invention, when parallelism in data references increases, such as in those instances where access to a database is performed at a high frequency, high throughput can be advantageously realized.

Embodiments of the present invention will be described below with reference to the drawings. The embodiments are only examples and the technical scope of the present invention should not be limited to these embodiments.

Operation Conditions for the Bc-Link Tree

An embodiment according to the present invention relates to a method for searching a tree structure called a "Bc-link tree." The "Bc-link tree" has the following characteristics in accordance with the embodiment.

Characteristic 1: The Bc-link tree has a configuration of linking leaf nodes with a bidirectional list in addition to the configuration of a B-link tree.

Characteristic 2: During descending of the tree in a read operation, locks on internal nodes are not acquired and only read locks on leaf nodes are acquired.

Characteristic 3: When a read operation has reached a leaf node not including a target key, a leaf node that should include the target key is searched by tracing the bidirectional list while acquiring a read lock.

Characteristic 4: In a write operation, as in the read operation, locks on internal nodes are not acquired and only write locks on leaf nodes are acquired. The bidirectional list is traced in the same manner. If addition/deletion of a leaf node is needed, the search is started over from descending of the tree using an algorithm of the B-link tree.

Characteristic 5: Not to load invalid data at the time of accessing to internal nodes, a load-load barrier instruction is executed after loading of the number of elements during descending of the tree, and then a key and data are loaded. If the content of the internal node is modified in the write operation, a store-store barrier instruction is executed after writing a key, data, an outlink pointer, which is a pointer associated with a neighboring node on the left of a node that is invalidated due to deletion, and then the number of elements are written. As the load-load barrier instruction and the store-store barrier instruction, a memory barrier instruction included in CPU instructions can be used.

In the Bc-link tree according to an embodiment of the present invention, a search can reach a target leaf node by tracing the bidirectional list as long as the search can reach a valid leaf node after descending the tree from a given internal node including the root node. Here, to reach the valid leaf node, the following conditions have to be satisfied during descending of the tree.

Condition 1: No infinite loop is present.
Condition 2: No node from which the search can go further is present.
Condition 3: A null pointer is not loaded.
Condition 4: A node whose memory area has already been released is not handled.

The above conditions 1 and 2 are conditions for reaching the valid leaf node commonly employed in the B-link tree. As described later using FIG. 11, regarding the condition 3, an uninitialized pointer "downlink," which is a pointer associated with a node at a lower layer, is not substantially referred to by other processing in processing using a function "insert_key_data( )" which is an insertion operation performed on the Bc-link tree according to an embodiment of the present invention. Since a deletion operation does not include processing for overwriting data by a null pointer, null is not set in the "downlink." Since a store-store barrier instruction is executed after setting the outlink pointer in the deletion operation, a null outlink pointer is not referred to by other processing.

Small overhead and high scalability are realized by minimizing the number of times locks are acquired during the descending of a tree structure according to the present invention. More specifically, locks for internal nodes are not acquired but the locks are acquired only for leaf nodes. Since the locks are not acquired for the internal nodes, the search can reach a leaf node that should include a target key or neighboring leaf nodes quickly. When the search has reached a leaf node not including the target key, the search can reach the leaf node that should include the target key by tracing bidirectional lists of leaf nodes while acquiring the locks. In order not to load an invalid pointer, e.g., a null pointer or a pointer to a node whose memory area has already been released, of an internal node during the descending of the tree, a memory barrier instruction can be used. The processing load using the memory barrier instruction is lighter than that for the acquisition of locks.

Concept of the Bc-Link Tree

FIG. 1 is a block diagram showing the concept of a Bc-link tree according to an embodiment of the present invention. According to the embodiment, the Bc-link tree 700 has the structure of a B-link tree. More specifically, the Bc-link tree 700 has a root node 810, internal nodes 820 and 830, leaf nodes 840, 850, 860, 870, 880, and 890, edges 710, 720, 740, 742, 744, 746, 748, and 750, and a unidirectional list 730. The root node 810 can be simply referred to as a root, whereas the leaf node can be simply referred to as a leaf. These nodes can constitute a hierarchical structure extending from the root node 810 to the leaf nodes 840, 850, 860, 870, 880, and 890.

The leaf nodes or a set of leaf nodes can correspond to a set of data stored on a computer-readable medium, for example. Although FIG. 1 illustrates a three-layer hierarchical structure, the number of layers of the hierarchical structure of the Bc-link tree according to the present invention can be set freely. In another embodiment, the Bc-link tree 700 can be part of a larger Bc-link tree that has an upper layer and the root node 810 can be part of the internal nodes of the larger tree. In still another embodiment, the Bc-link tree 700 can be extracted from another larger Bc-link tree and the illustrated nodes can be internal nodes of the larger tree. Each step of a search operation from the root node 810 to the leaf nodes 840 to 890 will be described below.

The Bc-link tree 700 shown in FIG. 1 includes bidirectional lists 760, 762, 764, 766, and 768, which are not included in the related art. These lists are used to bidirectionally associate the leaf nodes 840 to 890. This is a characteristic of the Bc-link tree 700 according to the present invention. The detailed operation of the bidirectional lists 760, 762, 764, 766, and 768 will be described later using FIG. 9.

Each node of the Bc-link tree 700 shown in FIG. 1 can include, as data, a value associated with a frame. For example, the root node 810 can include values "70" and "140" as a "low key" 702 and a "high key" 704, respectively. In FIG. 1, the "high key" 704 is represented by a thick frame.

For example, in a method for searching a tree structure according to the present invention, the root node 810 receives, as a search key, a given value whose magnitude relation can be determined based on the "low key" 702 or the "high key" 704. Furthermore, a leaf node including the search key can be found by sequentially tracing the hierarchical structure in the Bc-link tree 700.

In an exemplary embodiment, the Bc-link tree 700 according to the present invention can receive, as a search key, a value whose magnitude relation can be determined based on the "low key" 702 or the "high key" 704 defined for the root node 810. For example, when an inquiry about a search is made to specify a location on a computer-readable medium that stores a value "45", the search follows the edge 710 to reach the internal node 820 in the Bc-link tree 700 in order to search for the value "45" that is smaller than the "low key" 702 on the basis of the "low key" 702 defined for the root node 810.

The search then follows the edge 742 on the basis of the magnitude relation between the value "45" and a plurality of keys included in the internal node 820 and can reach the leaf node 850 in the Bc-link tree 700. The leaf node 850 can include information of values "40" and "50" as a "low key" and a "high key", respectively. Accordingly, it can be determined that the search target value "45" is included in this leaf node 850. Other values are searched in a similar manner. For example, a value included in the leaf node 890 is identified in a search that traces the edges 720 and 750.

Since the Bc-link tree 700 according to the present invention has a hierarchical structure similar to the B-link tree, the Bc-link tree 700 can realize an operation similar to that of the B-link tree in this manner except that leaf nodes are linked to each other with the bidirectional lists 760 to 768. Algorithms of individual operations, such as a search, insertion, and deletion, will be described later using FIGS. 4, 5, and 6, respectively.

When the search descends the Bc-link tree, according to the present invention, for a read operation, a read lock does not have to be acquired for internal nodes. In the Bc-link tree, a read lock is acquired for a leaf node when the search reaches the leaf node, and a key can be searched in the leaf node. Accordingly, in the case of searching for a given key in the Bc-link tree, a read lock on a leaf node is acquired only once before completion of the operation if the key is present in the tree and contention between the read operation and a write operation is not caused. In a write operation, a write lock on a leaf node is acquired only once with a similar algorithm before completion of the operation if addition or deletion of the leaf node is not needed.

If addition or deletion of the leaf node is needed, the search is started over from the descending of the tree using the same algorithm as that of the B-link tree. Since the number of leaf nodes is significantly large, a plurality of threads rarely attempts to acquire a lock on a specific leaf node if keys for the search, insertion, and deletion are sufficiently distributed. In this manner, small overhead and high scalability can be realized in the Bc-link tree according to the present invention.

Contention Between Read Operation and Write Operation

FIGS. 2(a) to 2(e) are diagrams illustrating processing performed when contention between a read operation and a write operation occurs in an internal node according to an embodiment of the present invention. In this case, the read operation can reach an incorrect leaf node. However, a correct leaf node can be identified by tracing bidirectional lists of leaf nodes.

FIG. 2(a) is a diagram showing the initial state of an example in which contention between a search operation and an insertion operation occurs. Each node of the tree can have a field representing the number of elements belonging to it. In this example, the number of elements of a root node of the tree is equal to 2.

FIG. 2(b) shows an example in which the number of elements of the root node of the tree is loaded first in the search operation "search(tree, 80)." The insertion operation "insert (tree, 10, data)" is then performed. If the upper limit of the number of elements of the node is set equal to 3, capacity overflow can be caused in a leftmost leaf node.

Accordingly, a new leaf node is added and a value "20" serving as a key and a pointer to the new leaf node are added in a node located at an immediately upper layer. FIG. 2(c) shows a result of the insertion operation. Since the value "2" has been already loaded as the number of elements of the root node of the tree in the search operation, a key value "80" is searched within a range represented by the number of elements "2" in the search operation.

As a result, as shown in FIG. 2(d), the search operation reaches a leaf node not including the key value "80". However, since the search key value "80" is larger than a maximum key value "70" of the leaf node, the search operation is continuously performed while acquiring a read lock on a neighboring leaf node on the right as shown in FIG. 2(e). In this manner, the key value "80" can be identified at last in the search operation.

Such a read operation and a write operation can follow the following rules.

Read Rule 1: A lock on internal nodes is not acquired during the descending of the tree but a read lock is acquired only for leaf nodes in the read operation.

Read Rule 2: When the read operation has reached a leaf node not including a target key, a leaf node that should include the target key is searched by tracing bidirectional lists while acquiring the read lock.

Write Rule 1: In a write operation, as in a read operation, a lock is not acquired for internal nodes but a lock is acquired only for leaf nodes. An operation for tracing a bidirectional list is also the same as that of the read operation. If addition/deletion of a leaf node is needed, the operation is started over from the descending of the tree using an algorithm similar to that for a B-link tree.

Write Rule 2: A load-load barrier instruction is executed after loading of the number of elements during the descending of the tree so as not to load an invalid pointer in an internal node. When the internal node is modified in the write operation, the number of elements is written after execution of a store-store barrier instruction.

In a method for searching a tree structure according to the present invention, a correct result can be obtained for each operation by performing the operations in this manner even if contention between the read operation and the write operation occurs.

Contention Between Search Operation and Deletion Operation

FIGS. 3(a) to 3(d) are diagrams illustrating processing performed when contention between a search operation and a deletion operation occurs according to an embodiment of the present invention.

FIG. 3(a) shows an initial state of an example in which contention between a search operation and a deletion operation occurs. FIG. 3(b) shows a state where the number of elements of a root node of a tree is loaded in the search operation "search(tree, 80)." It is assumed that a deletion operation "delete(tree, 40)" is performed in the state shown in FIG. 3(b). As shown in FIG. 3(c), a leaf node is deleted based on a B-link tree algorithm according to the related art, and a key value "40" corresponding to the deleted leaf node included in the root node of the tree and neighboring data on the right are also deleted.

When an element is deleted, elements having values larger than the value of the deleted element are moved to the left by one position. The leftmost element is not overwritten but remains as it is. As shown in FIG. 3(d), the elements can be traced down after loading a pointer of leftmost data, pointer on the right of the original key value "70", in the search operation in order to perform a search in the root node while assuming that the number of elements is equal to 3. However, since the loaded pointer is a valid pointer, the key value "80" can be found.

In this manner, the Bc-link tree employed in a method for searching a tree structure according to the present invention can correctly operate even if contention between a read operation and a write operation occurs.

Data Structure

The data structure of a node of a Bc-link tree according to an embodiment of the present invention can be represented, for example, using the following pseudo-code shown in Table 1.

TABLE 1

```
struct bclinktree__node {
    node__type type;                                     /* (I-a) */
    read_write__lock__type lock;                         /* (I-b) */
    volatile int num__elems;                             /* (I-c) */
    volatile int high__key;                              /* (I-d) */
    struct blinktree__node * volatile left__sibling;     /* (I-e) */
    struct blinktree__node * volatile right__sibling;    /* (I-f) */
    struct blinktree__node * volatile outlink;           /* (I-g) */
    volatile key__type key[MAX__NUM__ELEMENTS];          /* (I-h) */
    volatile data__type data[MAX__NUM__ELEMENTS +        /* (I-i) */
      1];
};
```

In the data structure, the item (I-a) indicates a definition for discriminating leaf nodes from internal nodes. The item (I-b) indicates a read/write lock. The item (I-c) indicates the number of elements. The item (I-d) indicates the maximum key value that this node and child nodes thereof can have. The item (I-e) indicates a neighboring node on the left. The item (I-f) indicates a neighboring node on the right. The item (I-g) indicates a definition of indicating a valid node when this node is deleted. The item (I-h) indicates a definition of a key, such as a search key. The item (I-i) indicates a definition of data, such as a set of data or a database.

Leaf nodes use the left_sibling and the right_sibling to form bidirectional lists. Internal nodes use the right_sibling and outlink in the same manner as the usage of items rightlink and outlink of a B-link tree. Since outlink and the left_sibling are not used at the same time, they can be mapped at the same field. The memory usage in this case is the same as that of the B-link tree.

Operation on Bc-Link Tree:

Algorithms of operations for searching, inserting, and deleting one key in a Bc-link tree will be illustrated below. An operation performed on a given range of keys can be realized by a combination of these basic operations and a search of bidirectional lists of leaf nodes.

Search Algorithm

Figure 4:
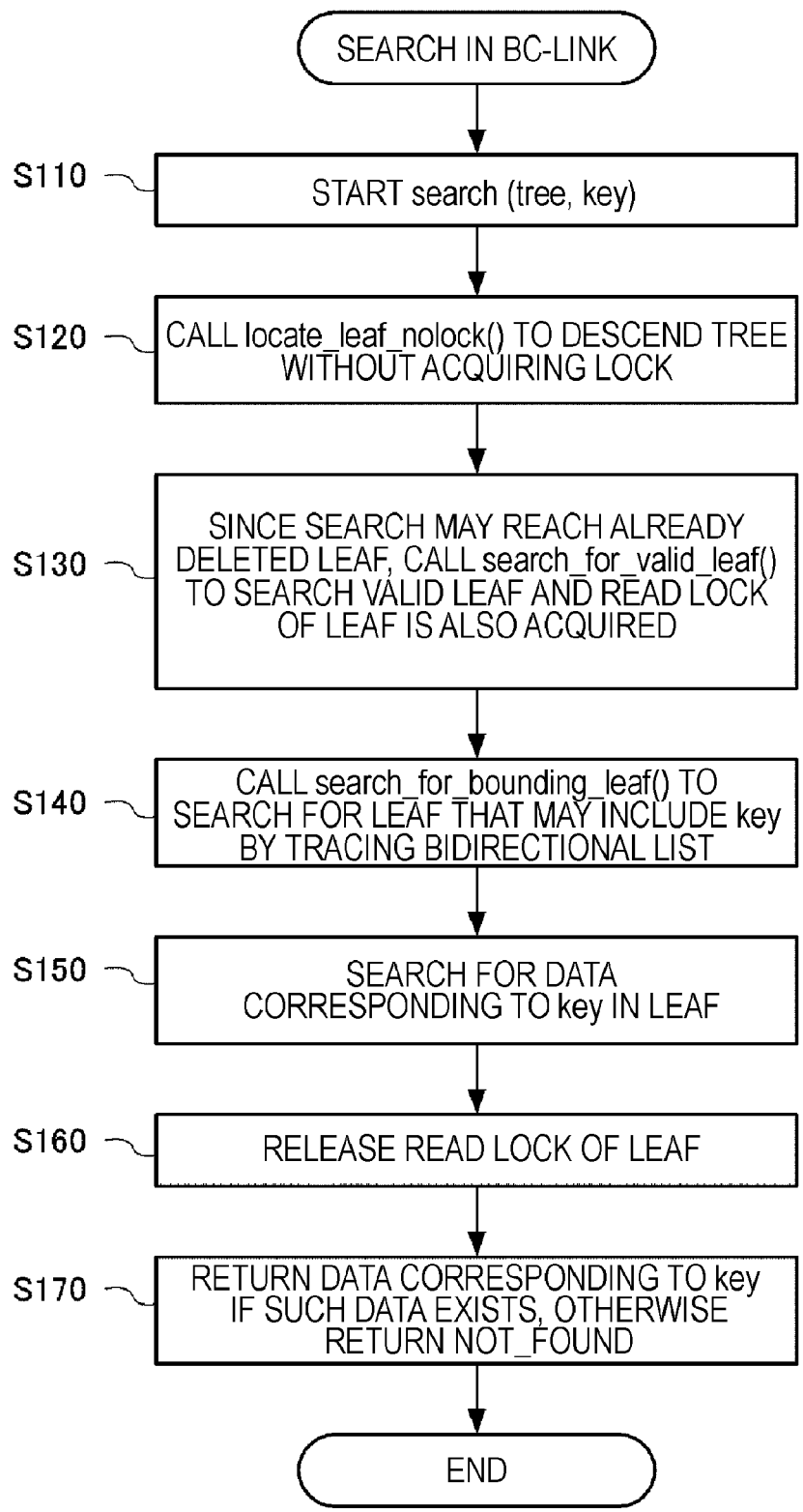
FIG. 4 is a flowchart showing an algorithm of a search operation of a Bc-link tree according to an embodiment of the present invention.

FIG. 4 is a flowchart showing an algorithm of a search operation performed on a Bc-link tree according to an embodiment of the present invention. Operations performed at each step are as follows.

S110: A function "search(tree, key)" is started. Here, the "search" indicates a search operation, whereas the "tree" and the "key" indicate a search-target tree structure and a search key, respectively.

S120: A function "locate_leaf_nolock( )", which implements processing for descending the tree without acquiring a lock, is called and executed.

S130: Since the search can reach a leaf node that has been already deleted, a function "search_for_valid_leaf( )", which implements processing for searching for a valid leaf node, is called and executed. At this time, a read lock on the leaf node is acquired.

S140: A function "search_for_bounding_leaf( )", which implements processing for searching for a leaf node that should include the "key" by tracing bidirectional lists, is called and executed.

S150: Data corresponding to the "key" is searched in the leaf node.

S160: The read lock on the leaf node is released.

S170: If the data corresponding to the "key" is present, the data is returned. Otherwise, NOT_FOUND is returned. The process then terminates.

As an operation for returning the data corresponding to the key if such data is present, part of S170, among these steps, a step of a search operation performed in a B-link tree according to the related art can be commonly used. For example, a function "search_for_key( )" defined by the following representation in Table 2 can be used.

TABLE 2

```
search_for_key(node, key, max) {
    return index, such that (0 <=  index && index <= max &&
                             node->key[index-1] < key &&
                             key <= node->key[index]);
}
```

Processing included in the method according to the present invention that calls the search operation represented as "search_for_key( )" can use the number of pieces of data included in a specific node as a variable "max."

Figure 5:
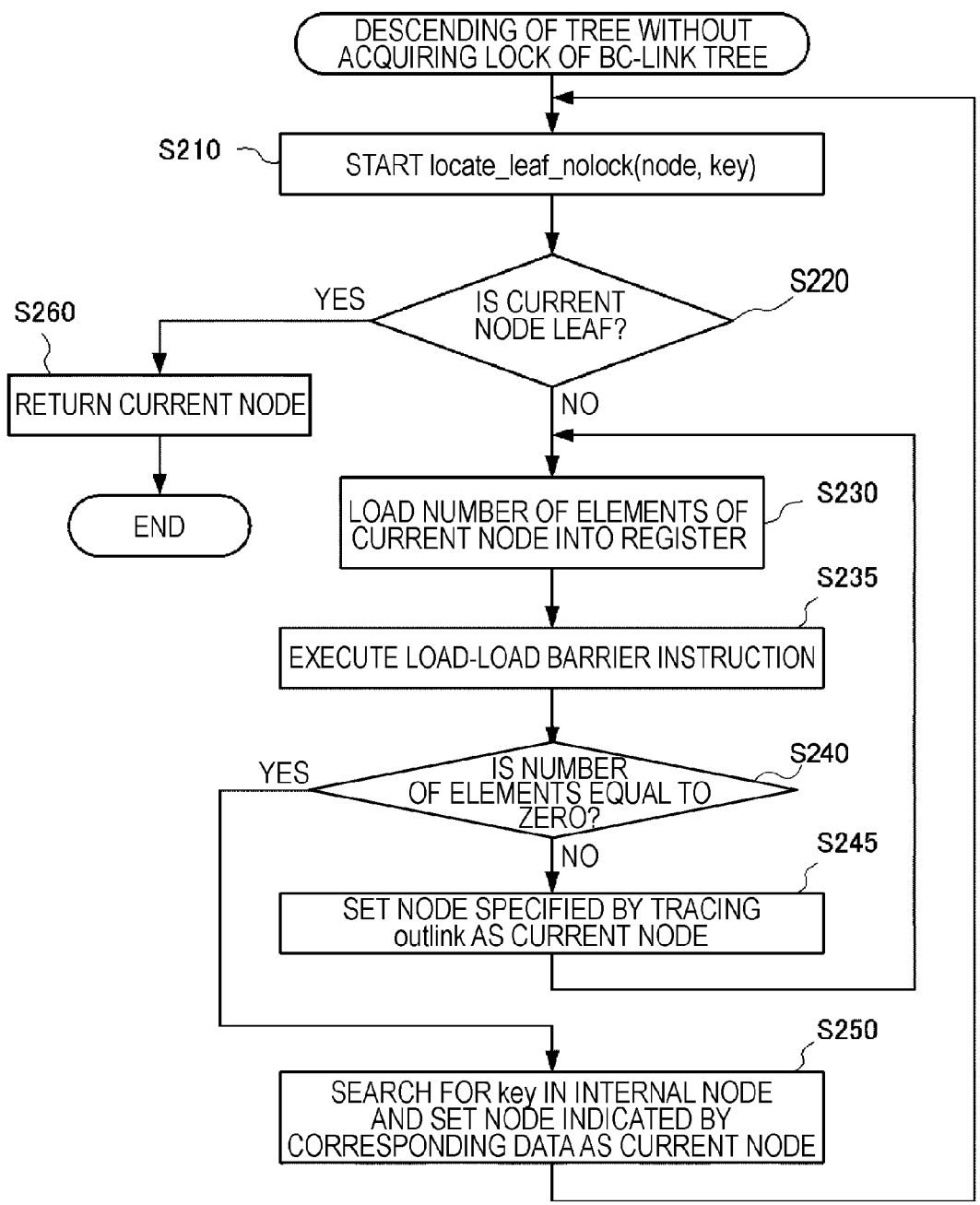
FIG. 5 is a flowchart showing an algorithm for descending a tree without acquiring a lock on a Bc-link tree according to an embodiment of the present invention.

FIG. 5 is a flowchart showing an algorithm for descending a Bc-link tree without acquiring a lock on the tree according to an embodiment of the present invention. An operation for descending the tree without acquiring the lock on the Bc-link tree is as follows.

S210: A function "locate_leaf_nolock(node, key)" is started. Here, the "node" and the "key" represent a variable representing an operation-target node and a search key, respectively.

S220: Whether a current node is a leaf node is determined. If it is determined to be true, the process proceeds to S260. Otherwise, the process proceeds to S230.

S230: The number of elements of the current node is loaded into a register.

S235: A load-load barrier instruction is executed.

S240: Whether the number of elements is equal to zero is determined. If it is determined to be true, the process proceeds to S250. Otherwise, the process proceeds to S245.

S245: A node that the search has reached by tracing the outlink is set as the current node and the process then returns to S230.

S250: The key is searched in the internal node. A node indicated by the corresponding data is set as the current node and the process then returns to S210.

S260: The current node is returned and the process terminates.

Figure 6:
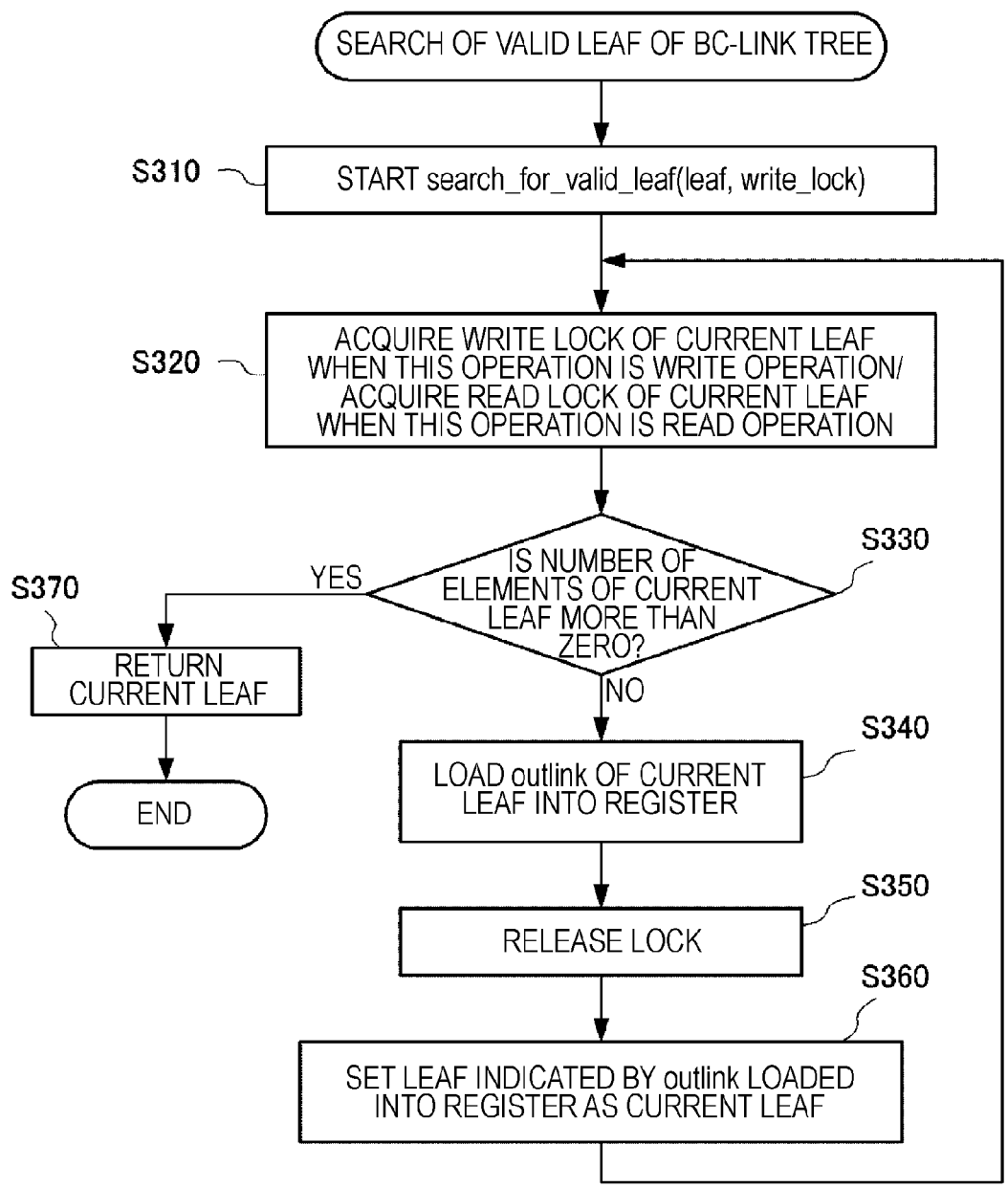
FIG. 6 is a flowchart showing an algorithm for searching for a valid leaf of a Bc-link tree according to an embodiment of the present invention.
Figure 7:
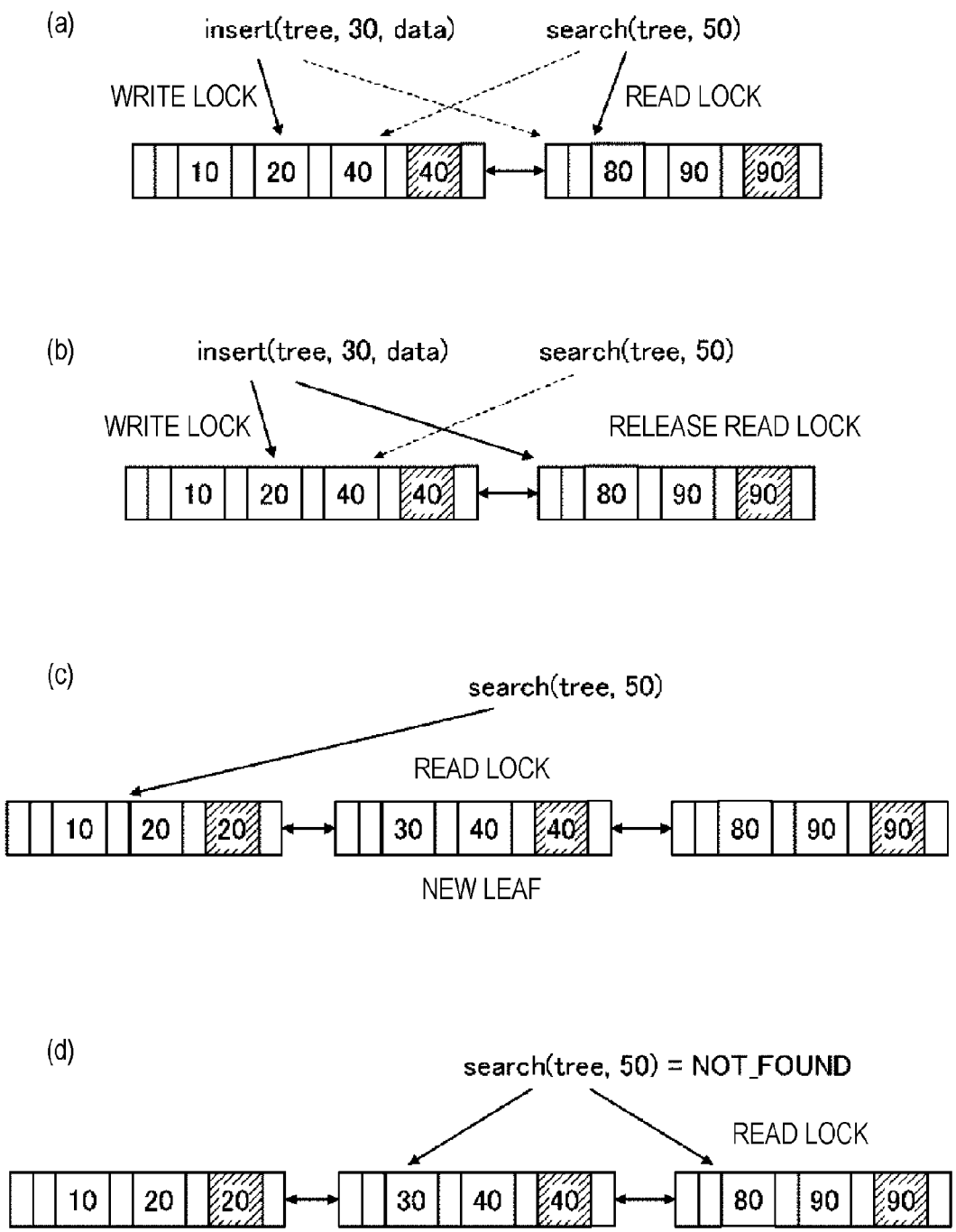
FIGS. 7(a) to 7(d) are diagrams showing a method for avoiding deadlock in a method for searching a tree structure according to an embodiment of the present invention.

FIG. 6 is a flowchart showing an algorithm for searching for a valid leaf in a Bc-link tree according to an embodiment of the present invention. An operation for searching for a valid leaf in a Bc-link tree is as follows.

S310: A function "search_for_valid_leaf(leaf, write_lock)" is started. Here, the "leaf" and the "write_lock" represent an operation-target leaf node and a flag indicating whether to acquire a write lock or a read lock, respectively.

S320: In the case of a write operation, a write lock on a current leaf node is acquired. In the case of a read operation, a read lock on the current leaf node is acquired.

S330: Whether the number of elements of the current leaf node is more than zero is determined. If it is determined to be true, the process proceeds to S370. Otherwise, the process proceeds to S340.

S340: The outlink of the current leaf node is loaded into a register.

S350: The lock is released.

S360: A leaf node indicated by the outlink that has been loaded into the register is set as the current leaf node.

S370: The current leaf node is returned and the process terminates.

Avoidance of Deadlock

FIGS. 7(a) to 8(b) are diagrams showing methods for avoiding deadlock in a method for searching a tree structure according to an embodiment of the present invention.

The deadlock can be problematic in a search performed using bidirectional lists of leaf nodes. To confirm that a given key is a value between two leaf nodes, read locks on two leaf nodes have to be acquired at the same time. On the other hand, simultaneous acquisition of write locks on two or more leaf nodes are also required in an insertion operation and a deletion operation, which will be described later. An attempt to acquire a lock in opposite directions at the same time in the read operation and the write operation causes deadlock.

FIG. 7(a) illustrates a method for avoiding deadlock according to an embodiment of the present invention. When a function "insert(tree, 30, data)" has a write lock on the left leaf node and a function "search(tree, 50)" has a read lock on the right leaf node, the functions "insert( )" and "search( )" attempt to acquire the locks on the right leaf node and the left leaf node, respectively. In this manner, deadlock occurs. In this case, if a function allowing deadlock to be detected and a lock operation to be performed again is provided, the function can be used. However, in the present invention, the deadlock can be avoided without using such a function by sequentially acquiring the lock from the left to the right when two or more leaf nodes are locked at the same time.

As shown in FIG. 8(a), in a method for avoiding deadlock according to an embodiment of the present invention, when leaf nodes are traced from the left to the right, a lock on the left leaf node can be released after acquisition of a lock on the right leaf node. This method is generally called lock coupling. Furthermore, as shown in FIG. 8(b), when leaf nodes are traced from the right to the left as opposed to the above-described case, the lock on the left leaf node can be acquired after release of the lock on the right leaf node.

The methods shown in FIGS. 8(a) and 8(b) can be applied to the method shown in FIGS. 7(a) to 7(d). In an embodiment, as shown in FIG. 7(b), since the function "search(tree, 50)" performs a search in the left direction, a read lock is first released. During this period, the function "insert(tree, 30, data)" can terminate an insertion operation of a key and a new leaf node.

As shown in FIG. 7(c), the function "search(tree, 50)" can then acquire the read lock and start a search in the right direction at this time. The locks on two leaf nodes can be acquired using the lock coupling in the search in the right direction. In this example, it is determined that the key 50 is not included in the tree based on a state shown in FIG. 7(d).

In the method for performing searching of a tree structure according to the present invention, deadlock can be avoided in this manner by applying the lock coupling to leaf nodes linked by bidirectional lists. This is a characteristic of the present invention.

Figure 9:
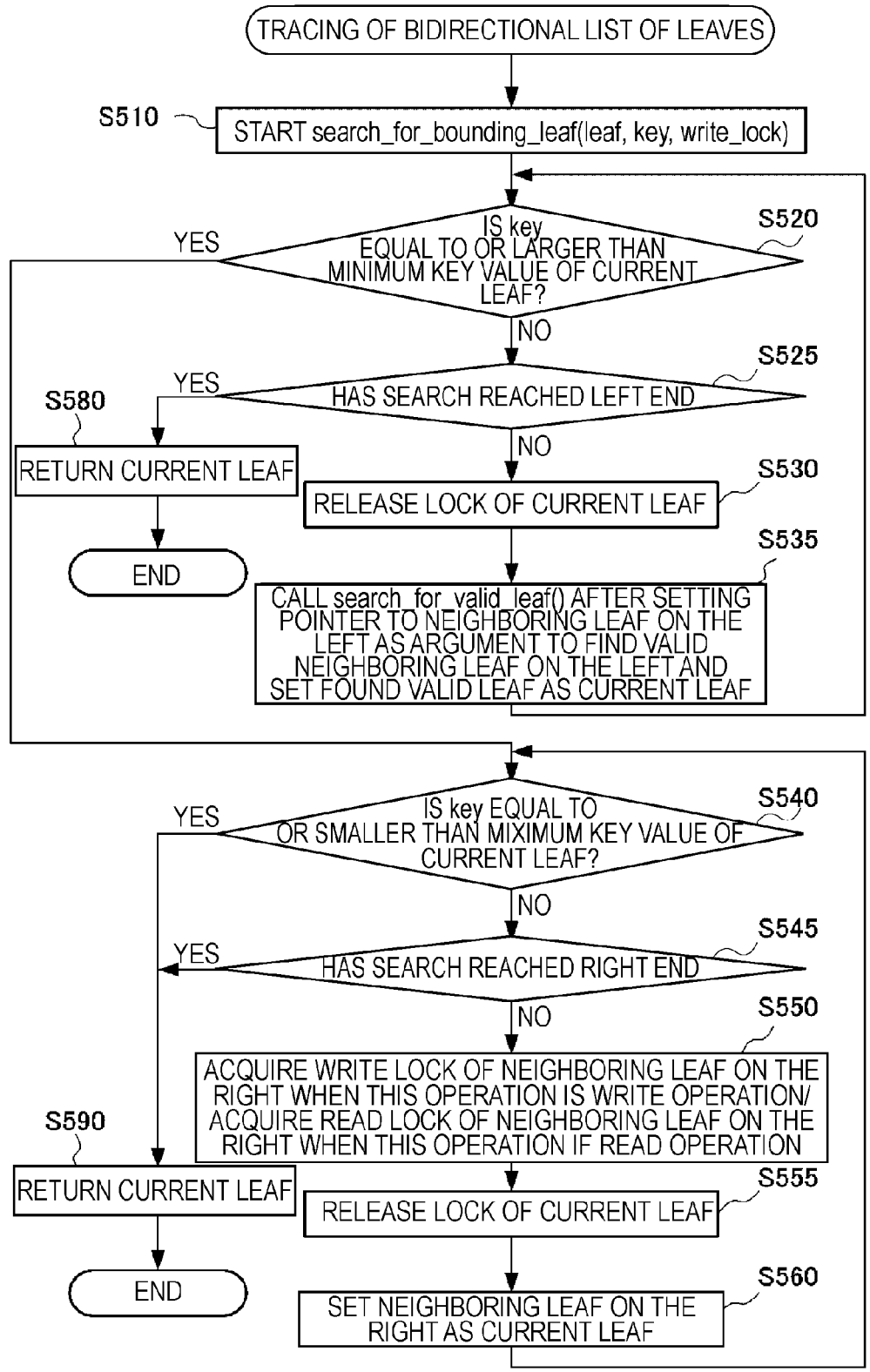
FIG. 9 is a flowchart showing an algorithm for tracing bidirectional lists of leaf nodes included in a tree structure according to an embodiment of the present invention.

Utilization of Bidirectional List FIG. 9 is a flowchart showing an algorithm for tracing bidirectional lists of leaf nodes included in a tree structure according to an embodiment of the present invention. A procedure for tracing the bidirectional list is as follows.

S510: A function "search_for_bounding_leaf(leaf, key, write_lock)" is started.

S520: Whether the "key" is equal to or larger than the minimum key value of a current leaf node is determined. If it is determined to be true, the process proceeds to S540. Otherwise, the process proceeds to S525.

S525: Whether the search has reached the left end is determined. If it is determined to be true, the process proceeds to S580. Otherwise, the process proceeds to S530.

S530: A lock on the current leaf node is released.

S535: A function "search_for_valid_leaf( )", which implements processing for searching for a valid leaf, is called after setting a pointer to a neighboring node on the left as an argument so as to find a valid leaf node on the left. The found leaf node is set as the current node.

S540: Whether the "key" is equal to or smaller than the maximum key value of the current leaf node is determined. If it is determined to be true, the process proceeds to S590. Otherwise, the process proceeds to S545.

S545: Whether the search has reached the right end is determined. If it is determined to be true, the process proceeds to S590. Otherwise, the process proceeds to S550.

S550: In the case of a write operation, a write lock on the neighboring leaf node on the right is acquired. In the case of a read operation, a read lock is acquired.

S555: The lock on the current leaf is released.

S560: The neighboring leaf node on the right is set as the current leaf node.

S580: The current leaf node is returned. The process then terminates.

S590: The current leaf node is returned. The process then terminates.

Insertion in Bc-Link Tree

Figure 10:
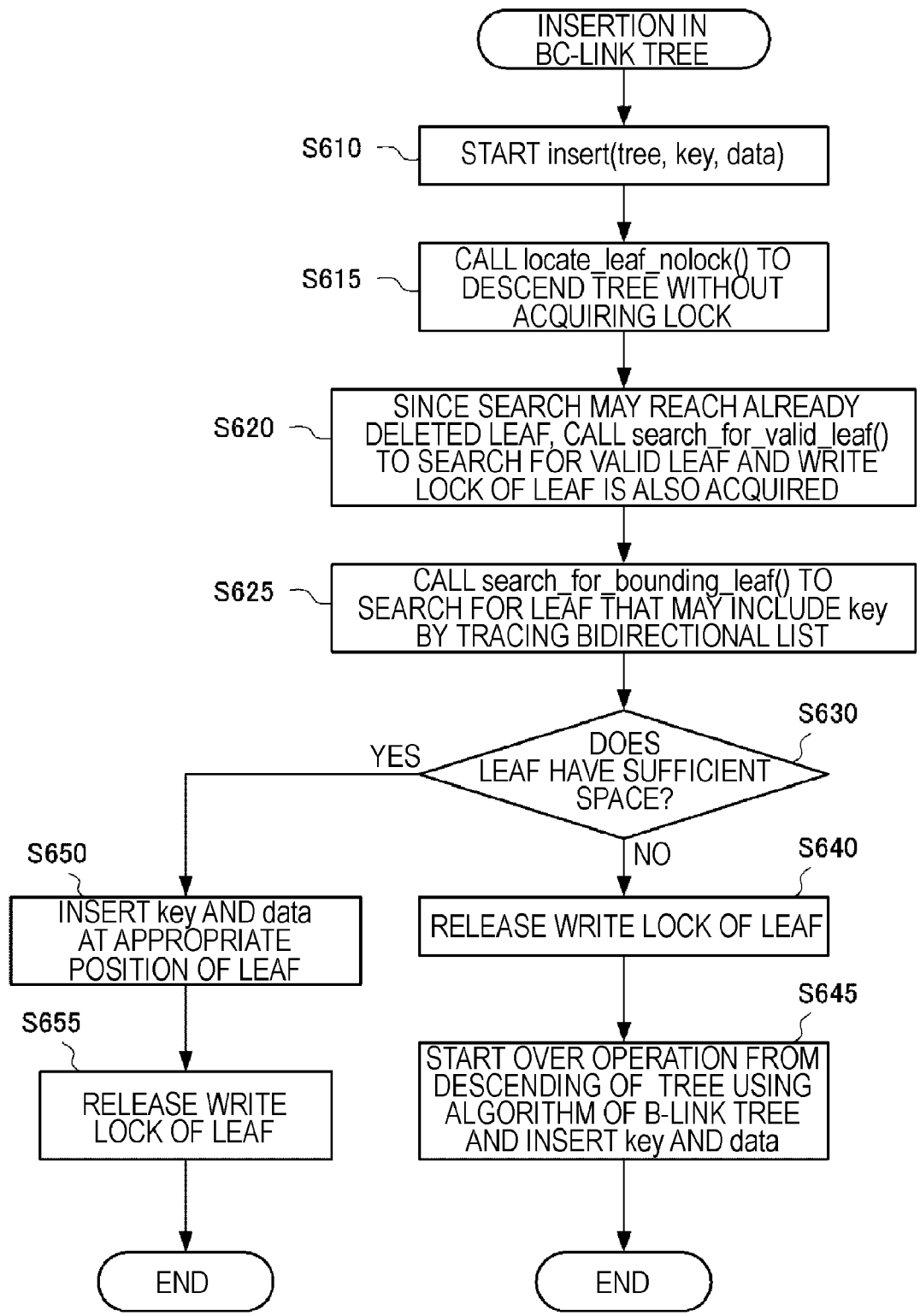
FIG. 10 is a flowchart illustrating a method of an insertion operation performed on a Bc-link tree according to an embodiment of the present invention.

FIG. 10 is a flowchart illustrating a method for performing an insertion operation in a Bc-link tree according to an embodiment of the present invention. A procedure of an insertion operation performed in a tree is as follows.

S610: A function "insert(tree, key, data)" is started.

S615: A function "locate_leaf_nolock( )", which implements processing for descending the tree without acquiring the lock, is called and executed.

S620: Since the operation can reach a leaf node that has already been deleted, a function "search_for_valid_leaf( )", which implements processing for searching for a valid leaf node, is called and executed. At this time, a write lock on the leaf node is also acquired.

S625: A function "search_for_bounding_leaf( )", which implements processing for searching for a leaf node that should include the "key" by tracing bidirectional lists, is called and executed.

S630: Whether the leaf node has a sufficient space (capacity) is determined. If it is determined to be true, the process proceeds to S650. Otherwise, the process proceeds to S640.

S640: The write lock on the leaf node is released.

S645: The operation is started over from the descending of the tree using an algorithm of a B-link tree to insert the "key" and the "data". The process then terminates.

S650: The "key" and the "data" are inserted at an appropriate position of the leaf node.

S655: The write lock on the leaf node is released. The process then terminates.

The "key" and the "data", included in the arguments of the function "insert( )" at S610 and inserted at S650, can be a new key and new data. If the leaf node does not have sufficient space, an insertion operation can be executed using an algorithm of a B-link tree.

Differences from the B-link tree algorithm according to the related art are that, when a new leaf node is inserted, the inserted node is linked with neighboring nodes with a bidirectional list, and the number of elements is updated after insertion of the "key" and the "data" in an internal node and execution of a store-store barrier instruction.

Figure 11:
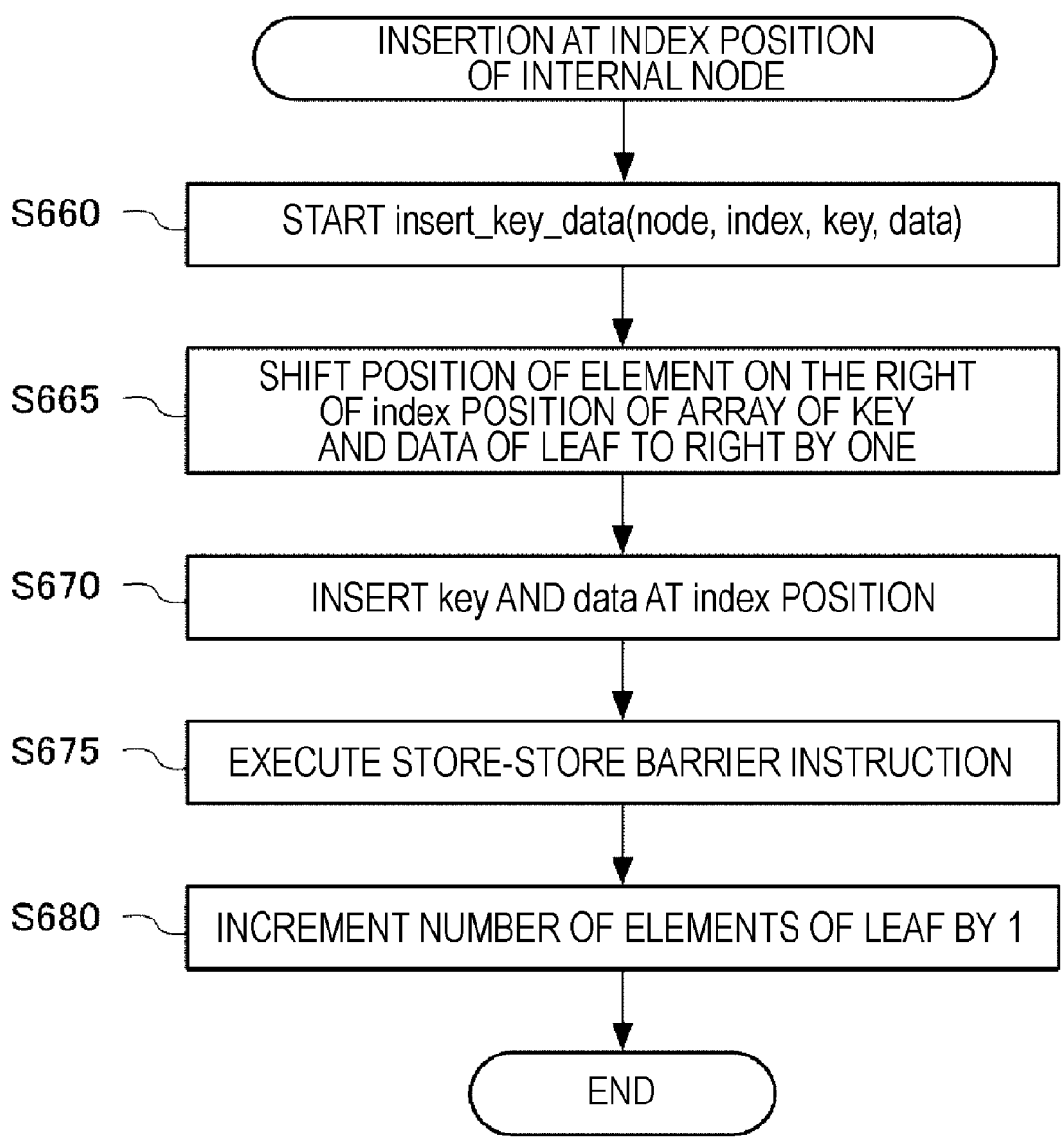
FIG. 11 is a flowchart illustrating a method for inserting a key and data at an index position of an internal node according to an embodiment of the present invention.

FIG. 11 is a flowchart illustrating a method for inserting a key and data at an index position of an internal node according to an embodiment of the present invention. Insertion of the key and the data at the index position of the internal node includes an operation for inserting the key and the data while setting an index position as an insertion position, an operation for shifting existing keys and data to a neighboring position, e.g., to the right, and an operation for incrementing, increasing, the number of elements by 1.

S660: A function "insert_key_data(node, index, key, data)" is started. Here, the "node" is a variable that is received as an argument of processing and represents a node. The "index" is a variable representing an index position of an internal node.

S665: Elements of key and data arrays of the leaf node that are arranged on the right of a position indicated by the "index" are shifted to the right by one position.

S670: The "key" and the "data" are inserted at the "index" position.

S675: A store-store barrier instruction is executed.

S680: The number of elements of the leaf node is incremented by 1. The process then terminates.

Deletion in Bc-link Tree

Figure 12:
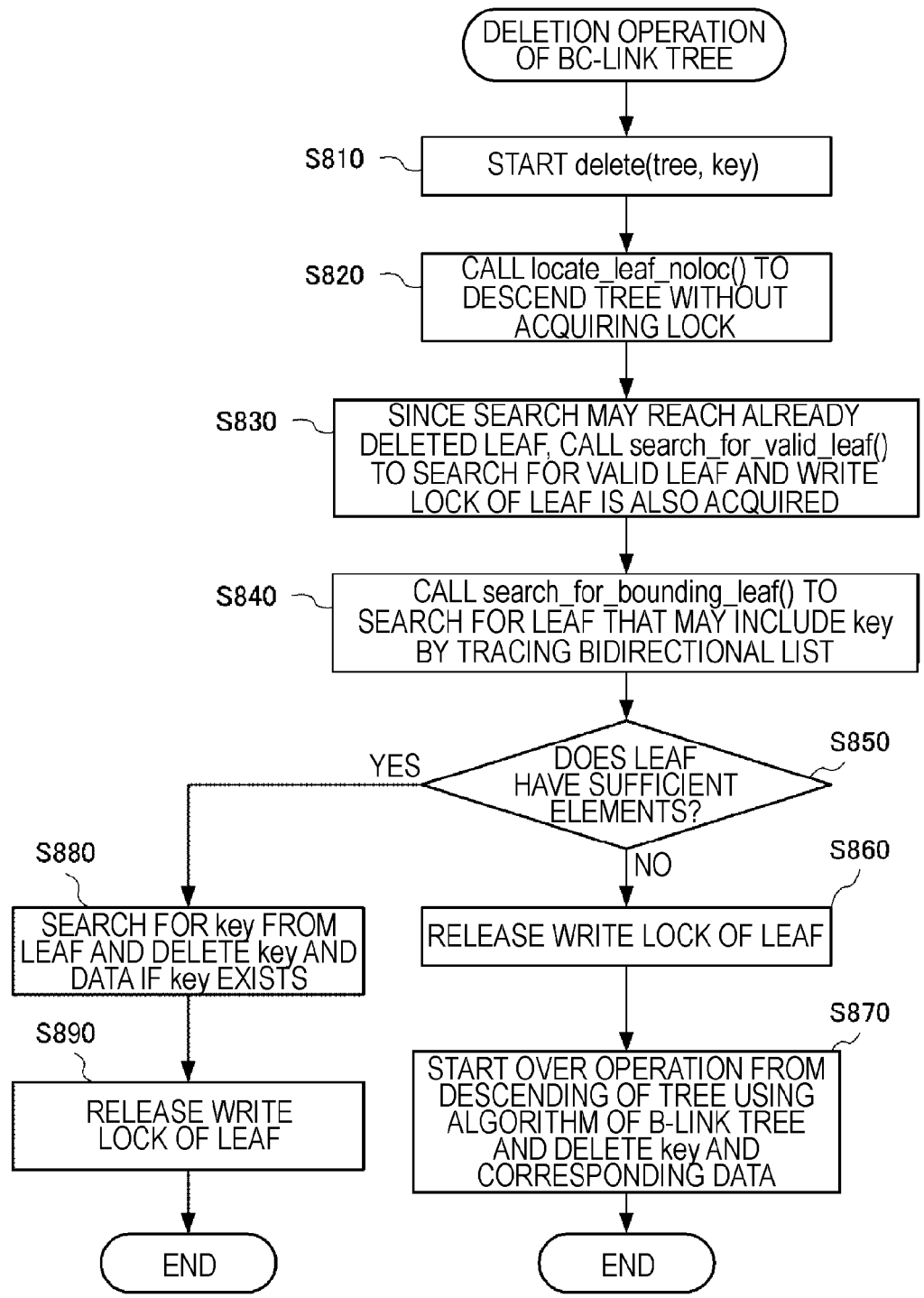
FIG. 12 is a flowchart illustrating a procedure of a deletion operation of a Bc-link tree according to an embodiment of the present invention.

FIG. 12 is a flowchart illustrating a procedure of a deletion operation performed in a Bc-link tree according to an embodiment of the present invention. The procedure of the deletion operation performed in the tree follows.

S810: A function "delete(tree, key)" is started.

S820: A function "locate_leaf_nolock( )", which implements processing for descending the tree without acquiring the lock, is called and executed.

S830: Since the operation can reach a leaf node that has already been deleted, a function "search_for_valid_leaf( )", which implements processing for searching for a valid leaf, is called and executed. At this time, a write lock on the leaf node is also acquired.

S840: A function "search_for_bounding_leaf( )", which implements processing for searching for a leaf node that should include the "key" by tracing bidirectional lists, is called and executed.

S850: Whether the leaf node has a sufficient number of elements is determined. If it is determined to be true, the process proceeds to S880. Otherwise, the process proceeds to S860.

S860: The write lock on the leaf node is released.

S870: The operation is started over from descending of the tree using an algorithm of a B-link tree, data corresponding to the "key" is deleted, and the process then terminates.

S880: The "key" is searched in the leaf node. If the "key" is present, the "key" and the corresponding data are deleted.

S890: The write lock on the leaf node is released. The process then terminates.

If the leaf node does not have a sufficient number of elements, a deletion operation can be executed using a B-link tree algorithm. Differences from the B-link tree algorithm according to the related art are that, when a leaf node is deleted, the bidirectional list is re-associated and, when an internal node is deleted, the number of elements is updated after execution of a store-store barrier instruction.

Figure 13:
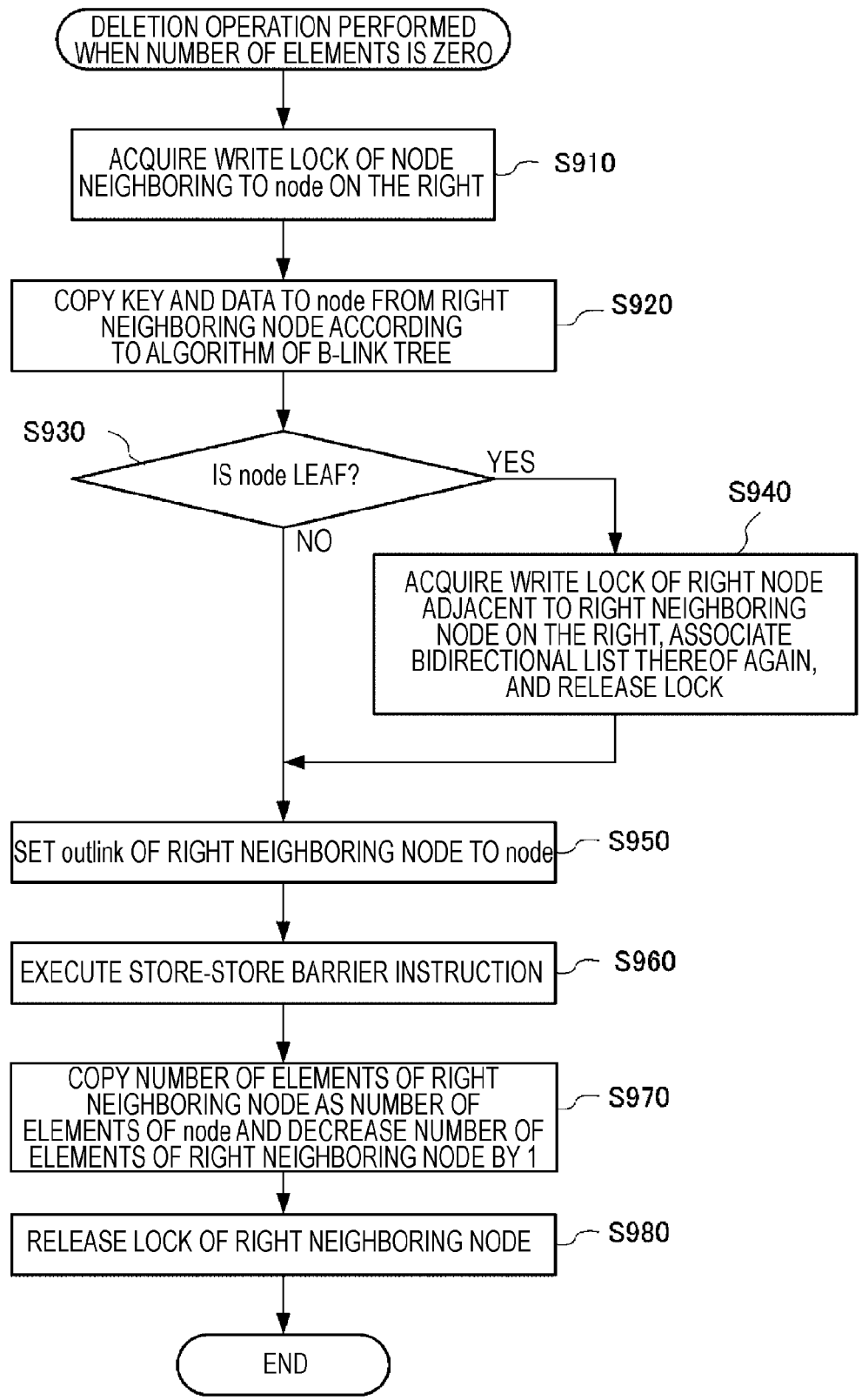
FIG. 13 is a diagram showing a deletion operation performed when the number of elements of a node becomes equal to zero according to an embodiment of the present invention.

FIG. 13 is a flowchart illustrating part of a deletion operation performed when the number of elements of a node becomes equal to zero according to an embodiment of the present invention. An operation performed at S970 can be (1) an operation for shifting a position of data located behind, e.g., on the right of, a deletion position in the internal node to a neighboring position, e.g., to the left or to the front, regarding a valid node neighboring, e.g., on the left of or in front of, a node having no elements or (2) an operation for temporarily storing information on a neighboring leaf node, e.g., on the left or behind, when the leaf node specified as the current node is invalidated.

S910: A write lock on a neighboring node on the right of a "node (which is a variable received as an argument of processing and representing a node)" is acquired.

S920: A key and data are copied from the node on the right to the "node" in accordance with a B-link tree algorithm.

S930: Whether the "node" is a leaf node is determined. If it is determined to be true, the process proceeds to S940. Otherwise, the process proceeds to S950.

S940: A write lock on a node on the right of the right neighboring node is acquired, a bidirectional list is re-associated, and the lock is then released.

S950: A pointer "outlink" of the right neighboring node is set to the "node".

S960: A store-store barrier instruction is executed.

S970: The number of elements of the right neighboring node is copied as the number of elements of the "node" and the number of elements of the right neighboring node is decremented by one.

S980: The lock on the right neighboring node is released. The process then terminates.

A memory area of a node deleted from a Bc-link tree must not be released immediately because the memory area can be referred to by a thread that is descending the tree in parallel to the current thread. Every parallel algorithm that uses a fine grain lock for a link structure of a tree structure commonly has a problem regarding releasing of a memory area. Accordingly, the method for searching a tree structure according to the present invention can employ any given memory area releasing method according to the related art.

For example, a method used for a B-link tree for recording deletion time of a node and determining that a memory area can be released after all processes that had started descending of the tree before the deletion time have completed can be used. In addition, when the GC described above using FIG. 6 is available, this can be used for releasing a memory area in a deletion operation of a Bc-link tree.

EXAMPLE

To confirm scalability of a Bc-link tree according to the present invention, a B+ tree and a B-link tree according to the related art and a Bc-link tree according to the present invention were implemented in the C language. Performance comparison was performed. "Pthread" was used as a thread library, while "pthread_rwlock_t" was used as a read/write lock. Only operations regarding a single key were implemented and operations regarding a specified range of keys were not implemented. In the B-link tree and the Bc-link tree, an algorithm for releasing a memory area of a deleted node was not implemented. In addition, sufficient thread local heaps were prepared so that allocation of memory areas did not become a bottleneck.

For the experimental environment, x86_64 Linux 2.6.18 (Red Hat Inc.) and 1.86 GHz 8 core Xeon (Intel Corporation) were used as an operating system and a central processing unit (CPU), respectively. An 8-Gbyte memory was used as a main memory. A 32-bit integer value and a 64-bit pointer were used as a key and data, respectively. In the experiment, time required for 40 million random operations performed on a tree constituted by 10 million pieces of random key data was measured and throughput was calculated. Two conditions, i.e., a condition including each kind of operations at a ratio of "search 80 percent, insertion 10 percent, and deletion 10 percent" and a condition including each kind of operation at a ratio of "search 40 percent, insertion 30 percent, and deletion 30 percent" were prepared. The experiment was carried out using such conditions.

Table 3 shows the node size and the in-node search algorithm used in the experiment. Values that gave the highest throughput when the experiment regarding the condition including the 80 percent search operation was carried out by eight threads were used as these parameters.

TABLE 3

The node size and the search algorithm used in the experiment.

|  | upper limit of the number of elements in a node | search algorithm used in a node |
| --- | --- | --- |
| B+ tree | 40 | linear search |
| B-link tree | 60 | binary search |
| Bc-link tree | 40 | binary search |

Figure 14:
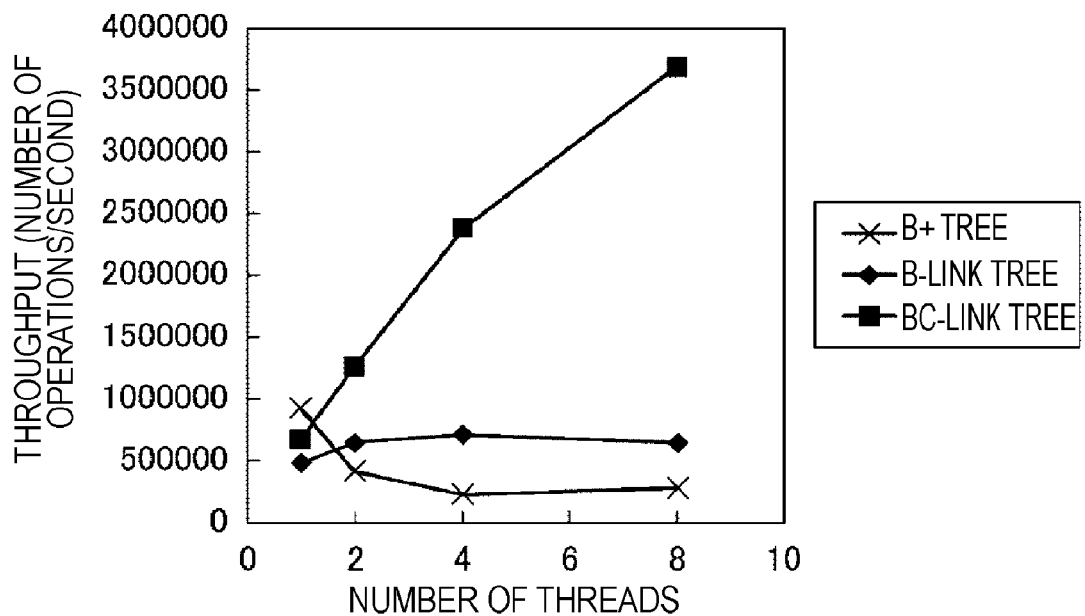
FIG. 14 is a diagram showing performance comparison obtained under a condition including eighty percent search operation.
Figure 15:
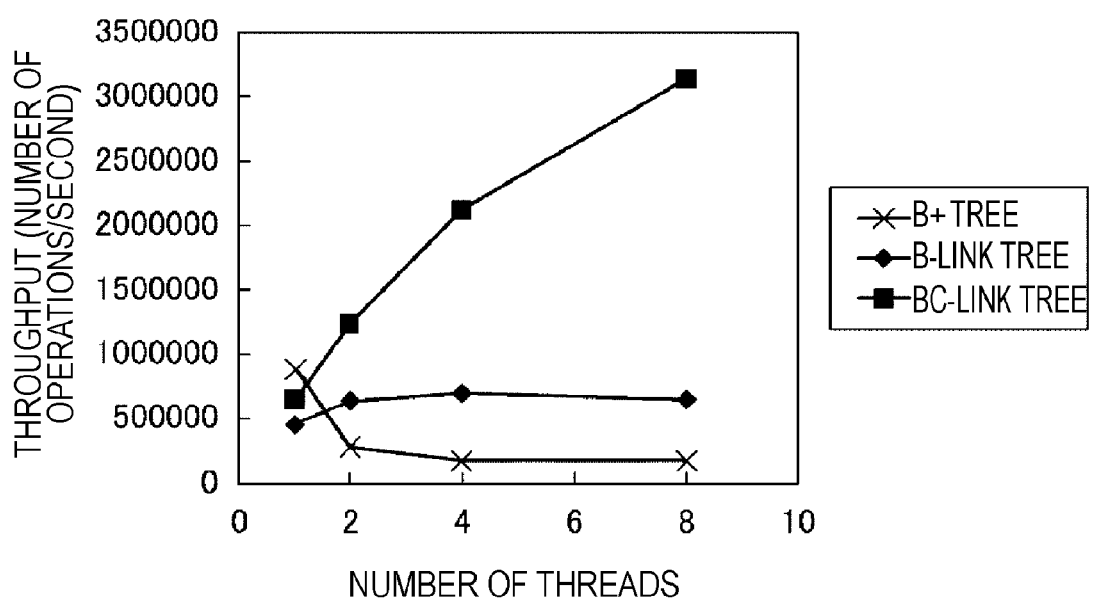
FIG. 15 is a diagram showing performance comparison obtained under a condition including forty percent search operation.

FIG. 14 shows results obtained under the condition including the 80 percent search operation, while FIG. 15 shows a result obtained under the condition including a 40 percent search operation. In the B+ tree and the B-link tree according to the related art, the throughput reaches a ceiling as the number of processing threads increases. In contrast, in the Bc-link tree according to the present invention, the throughput can improve substantially in proportional to an increase in the number of threads. These are the actual results that were obtained. Under either experimental condition, high throughput and high scalability can be realized in the Bc-link tree according to the present invention. It is obvious from this experiment result that the Bc-link tree is a tree structure suitable for symmetrical multiprocessing, parallel computing, and a multi-core machine.

Hardware Configuration of Apparatus for Searching Tree Structure

Figure 16:
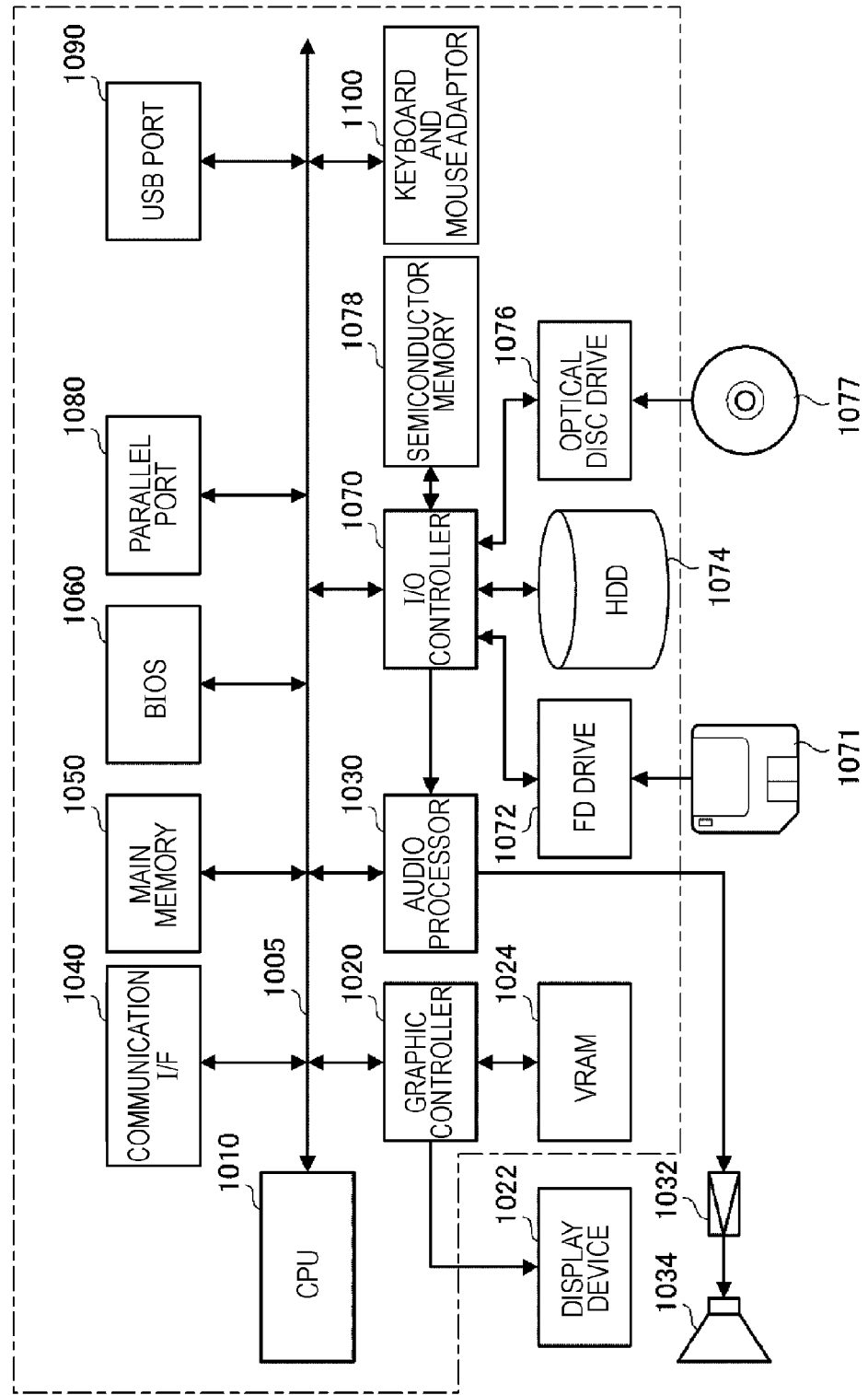
FIG. 16 is a diagram showing a hardware configuration of an apparatus for searching a tree structure according to an embodiment of the present invention.
Figure 17:
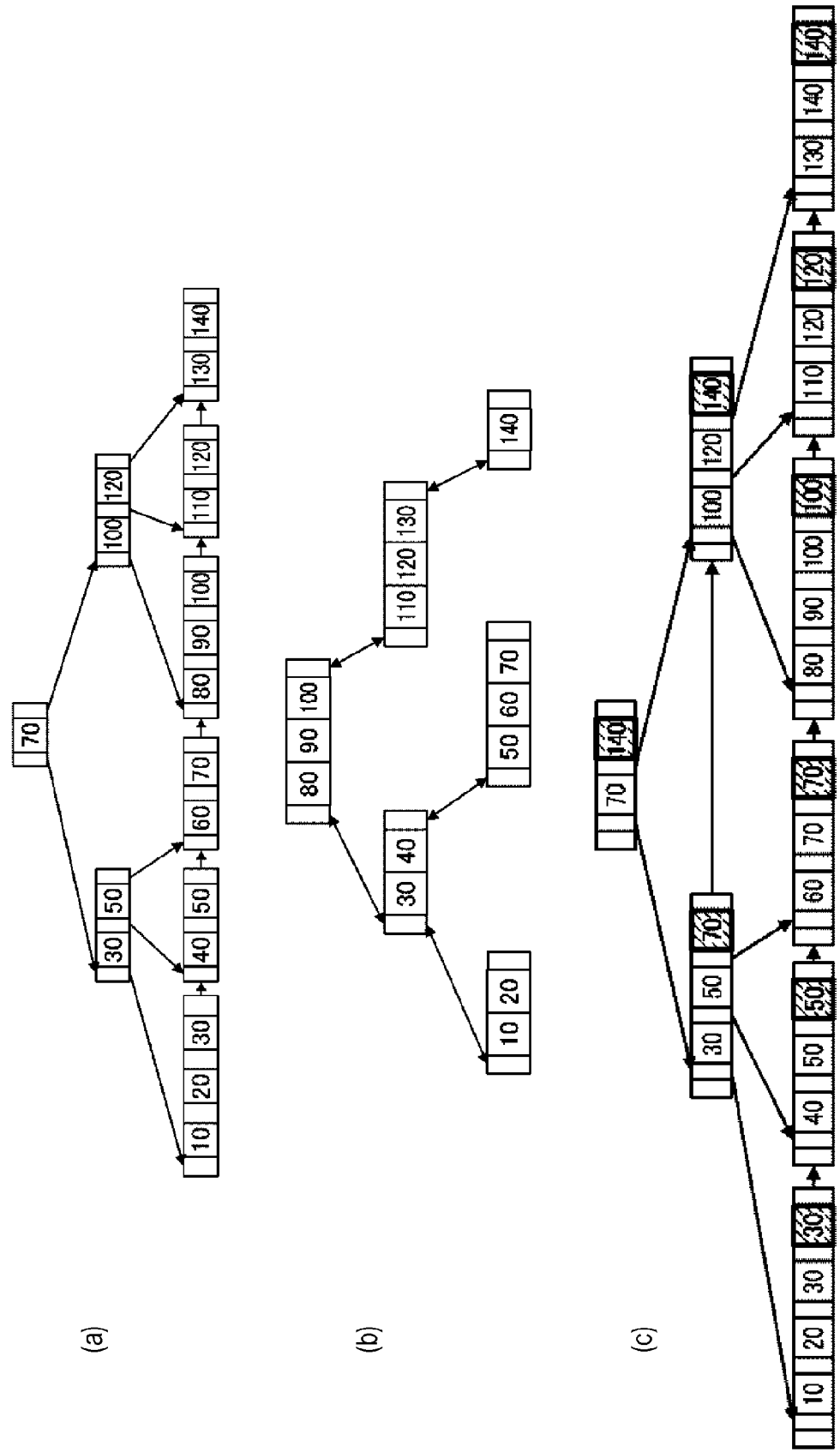
FIGS. 17(a) to 17(c) are diagrams showing tree structures.

FIG. 16 is a diagram showing a hardware configuration of an apparatus for searching a tree structure according to an embodiment of the present invention. FIG. 16 illustrates the hardware configuration of an information processing apparatus 1000 serving as the apparatus for searching the tree structure. The general configuration of an information processing apparatus, which is typically a computer, will be described below. A minimum necessary configuration can be selected in accordance with the environment.

The information processing apparatus 1000 includes a central processing unit (CPU) 1010, a bus 1005, a communication interface (I/F) 1040, a main memory 1050, a basic input output system (BIOS) 1060, a parallel port 1080, a universal serial bus (USB) port 1090, a graphic controller 1020, a video random access memory (VRAM) 1024, an audio processor 1030, an input/output (I/O) controller 1070, and input means such as a keyboard and mouse adapter 1100. Storage means, such as a flexible disk (FD) drive 1072, a hard disk drive (HDD) 1074, an optical disc drive 1076, and a semiconductor memory 1078, can be connected to the I/O controller 1070.

An amplifier circuit 1032 and a speaker 1034 are connected to the audio processor 1030. In addition, a display device 1022 is connected to the graphic controller 1020.

The BIOS 1060 stores a boot program executed by the CPU 1010 at the time of booting of the information processing apparatus 1000 and hardware-dependent programs depending on hardware of the information processing apparatus 1000. The FD (flexible disk) drive 1072 reads out programs or data from a flexible disk 1071 and supplies the programs or the data to the main memory 1050 or the HDD 1074 through the I/O controller 1070. Although FIG. 16 illustrates an example in which the HDD 1074 is included in the information processing apparatus 1000, the HDD 1074 can be externally connected to or added to the information processing apparatus 1000 by connecting an external device connection interface, not shown, to the bus 1005 or the I/O controller 1070.

For example, a DVD-ROM drive, a CD-ROM drive, a DVD-RAM drive, or a CD-RAM drive can be used as the optical disc drive 1076. In this case, it is necessary to use an optical disc 1077 corresponding to each drive. The optical disc drive 1076 reads programs or data from the optical disc 1077 and can supply the program or the data to the main memory 1050 or the HDD 1074 through the I/O controller 1070.

Computer programs supplied to the information processing apparatus 1000 can be stored on a recording medium, such as the flexible disk 1071, the optical disc 1077, or a memory card, e.g., a computer readable article of manufacture, provided by a user. The computer programs are read out from the recording medium through the I/O controller 1070 or are downloaded through the communication I/F 1040, thereby being installed in the information processing apparatus 1000 and executed. Since the operations that the computer programs cause the information processing apparatus to perform are the same as those performed in the apparatus already described.

The computer programs described above can be stored on external recording media, i.e., tangibly embodying computer readable instructions. In addition to the flexible disk 1071, the optical disc 1077, or the memory card, a magneto-optical recording medium such as an MD or a tape medium can be used as the recording media. In addition, the computer programs can be supplied to the information processing apparatus 1000 via a communication network using a storage device, such as a hard disk or an optical disc library, provided in a server system connected to a private communication network or the Internet as the recording medium.

The information processing apparatus 1000 has been described in the above example. Functions similar to those of the above-described information processing apparatus can be realized by installing programs, having the functions described regarding the information processing apparatus, in a computer and causing the computer to function as the information processing apparatus.

The apparatus can be realized as hardware, software, or a combination of hardware and software. When the apparatus is embodied by the combination of hardware and software, an embodiment such as a computer system having a predetermined program can be cited as a typical example. In such a case, the predetermined program is loaded into the computer system and executed, thus causing the computer system to perform operations according to the present invention.

This program can be constituted by a group of instructions represented by a given language, code, or description. Such a group of instructions enables the system to perform specific functions directly or after one of or both of (1) conversion to other languages, codes, or descriptions and (2) copying to other media. The present invention includes not only such a program itself but also a program product having the program recorded on a medium within the scope of the present invention. The program for enabling functions of the present invention to be performed can be stored on any computer-readable medium, such as a flexible disk, an MO, a CD-ROM, a DVD, a hard disk drive, a ROM, an MRAM, and a RAM. To store such a program on a computer-readable medium, the program can be downloaded from other computer systems connected through a communication network or copied from other media. Additionally, such a program can be stored on one or more recording media after being compressed or divided into a plurality of groups.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method implemented by a computing apparatus for tracing, on the basis of a key, an index created using a tree structure in order to access data stored on a computer-readable article of manufacture, the tree structure including one root node and at least one leaf node which, when at least two leaf nodes are present, (i) includes information that represents a relation with a neighboring leaf node and (ii) is bidirectionally linked to the neighboring leaf node, the method comprising the steps of:

searching the tree structure to reach a target node that can be associated with the key without acquiring a lock on the root node and on any internal node in the tree structure;

setting the target node as a current node when the target node is a leaf node;

moving the search to a node at a lower layer in the tree structure when the target node is an internal node by tracing an edge in the tree structure to reach a leaf node without acquiring a lock on any internal node and setting the leaf node as the current node; and associating the key with the leaf node specified as the current node by acquiring a lock on the leaf node specified as the current node, thereby accessing data stored on the computer-readable article of manufacture by the computing apparatus.

2. The method according to claim 1, wherein the tree structure has at least two internal nodes wherein a first of the internal nodes includes information that represents a relation with a second internal node and the first internal node is unidirectionally linked to the second internal node.

3. The method according to claim 1, wherein the step of associating includes the steps of:
loading the number of elements of the internal node, when searching for the node that can be associated with the key in a layer of an internal node in the tree structure;
executing a memory barrier instruction; and
searching for an internal node or a leaf node that can be associated with the key within a range of the number of elements in the internal node.

4. The method according to claim 1, wherein the step of associating includes the steps of:
moving the specification of the current node to another leaf node that can be associated with the key in a layer including the leaf node;
acquiring a lock on said another leaf node;
releasing a lock on the leaf node; and
associating said another leaf node with the key.

5. The method according to claim 1, wherein the step of associating includes a step of determining a result of a search based on a search key.

6. The method according to claim 1, further comprising:
inserting, as a new leaf node, a node including the data in the leaf node specified as the current node.

7. The method according to claim 1, further comprising the steps of: temporarily storing information of a neighboring leaf node when the leaf node specified as the current node is invalidated;
releasing a lock on the leaf node;
setting the neighboring leaf node as the current node; and
deleting the invalidated leaf node.

8. The method according to claim 1, further comprising the steps of: acquiring a write lock on the leaf node which is specified as the current node;
determining whether the leaf node has a capacity for insertion of a new element;
inserting the new element in the leaf node when the determination result is positive; and
releasing the write lock.

9. The method according to claim 8, wherein the step of inserting the new element includes:
inserting, when the determination result is negative, a new leaf node;
identifying an internal node for which an edge connecting the internal node and the new leaf node is to be inserted;
shifting a position of data at an insertion position in the internal node to a neighboring position;
executing a memory barrier instruction; and
incrementing the number of elements of the internal node.

10. The method according to claim 1, further comprising the steps of: acquiring a write lock on the leaf node specified as the current node; determining whether the specified current leaf node has a sufficient number of elements to be deleted;
deleting an element when the determination result is positive; and releasing the write lock.

11. The method according to claim 10, wherein the step of deleting the element includes:
deleting the leaf node when the determination result is negative; and
deleting an edge connecting the internal node and the deleted leaf node;
shifting a position of data located behind the deletion position in the internal node to a neighboring position;
executing a memory barrier instruction; and
decrementing the number of elements of the internal node.

12. The method of claim 1 further comprising searching the neighboring leaf node by tracing the bidirectional link while acquiring a lock on the neighboring node if the current node cannot be associated with the key.

13. A computer readable article of manufacture tangibly embodying computer readable instructions for executing a computer implemented method comprising the steps of:
searching a tree structure to reach a target node that can be associated with a key without acquiring a lock on the root node and on any internal node in the tree structure;
setting a target node as a current node when the target node is a leaf node;
moving a search to a node at a lower layer in the tree structure without acquiring a lock on any internal node when the target node is an internal node by tracing an edge in the tree structure to reach a leaf node;
setting the leaf node as the current node; and
associating the key with the leaf node specified as the current node by acquiring a lock on the leaf node specified as the current node.

14. The computer readable of manufacture of claim 13 wherein the method further comprises searching a neighboring leaf node by tracing a bidirectional link between the current node and the neighboring node while acquiring a lock on the neighboring node if the current node does not include the key.

15. A computer apparatus for tracing, on the basis of a key, an index created using a tree structure in order to access data stored on a computer-readable article of manufacture, the tree structure including one root node and at least one leaf node, the leaf node, when at least two leaf nodes wherein each, (i) includes information that represents a relation with a neighboring leaf node and (ii) is bidirectionally linked to the neighboring leaf node, the system comprising:
means for searching the tree structure to reach a node that can be associated with the key without acquiring a lock on the root node and on any internal node in the tree structure;
means for setting the searched-for node as a current node when the searched-for node is a leaf node;
means for moving the search to a node at a lower layer in the tree structure, when the searched-for node is an internal node, by tracing an edge in the tree structure to reach a leaf node without acquiring a lock on any internal node and setting the leaf node as the current node; and
means for associating the key with the leaf node specified as the current node by acquiring a lock on the leaf node specified as the current node.

16. The apparatus according to claim 15, wherein the structure has at least two internal nodes and a first internal node includes information that represents a relation with a second internal node and the first internal node is unidirectionally linked to the second internal node.

17. The apparatus according to claim 15, wherein the means for associating includes means for determining a result of a search based on a search key.

18. The computer apparatus of claim 15 wherein the means for associating the key searches the neighboring leaf node by tracing the bidirectional link while acquiring a lock on the neighboring node if the current node does not include the key.

* * * * *